US008451172B2

(12) United States Patent
Angeletti

(10) Patent No.: US 8,451,172 B2
(45) Date of Patent: May 28, 2013

(54) RECONFIGURABLE BEAM-FORMING-NETWORK ARCHITECTURE

(75) Inventor: Piero Angeletti, Lisse (NL)

(73) Assignee: Agence Spatiale Europeenne, Paris (FR)

( * ) Notice: Subject to any disclaimer, the term of this patent is extended or adjusted under 35 U.S.C. 154(b) by 306 days.

(21) Appl. No.: 12/879,420

(22) Filed: Sep. 10, 2010

(65) Prior Publication Data
US 2011/0102263 A1    May 5, 2011

(30) Foreign Application Priority Data

Sep. 10, 2009  (EP) ..................................... 09290697

(51) Int. Cl.
*H01Q 3/40* (2006.01)
(52) U.S. Cl.
CPC ..................................... *H01Q 3/40* (2013.01)
USPC ........................................................ 342/373
(58) Field of Classification Search
CPC ....................................................... H01Q 3/40
USPC .......................... 342/354, 368, 372, 374, 373
See application file for complete search history.

(56) References Cited

U.S. PATENT DOCUMENTS

| | | | | |
|---|---|---|---|---|
| 3,729,742 A * | 4/1973 | Boyns | ............................ | 342/374 |
| 5,936,592 A * | 8/1999 | Ramanujam et al. | ......... | 343/853 |
| 6,078,287 A * | 6/2000 | Thompson et al. | ............ | 342/368 |
| 6,181,276 B1 * | 1/2001 | Schlekewey et al. | ......... | 342/372 |
| 6,246,364 B1 * | 6/2001 | Rao et al. | ...................... | 342/368 |
| 6,831,601 B1 * | 12/2004 | Lopez et al. | .................. | 342/374 |
| 7,180,447 B1 | 2/2007 | Jacomb-Hood | | |

FOREIGN PATENT DOCUMENTS

| | | |
|---|---|---|
| EP | 0 480 086 A1 | 4/1992 |
| WO | WO-2007/053213 A1 | 5/2007 |

OTHER PUBLICATIONS

Bajon et al., "Synthesis Technique for Satellite Antennas Beam Forming Network," *Proceedings of the 25th European Microwave Conference*, Sep. 1995, Bologna, Italy, pp. 385-388.
European Search Report from European Patent Appl. No. 09290697. 3, completed Apr. 15, 2010.

* cited by examiner

*Primary Examiner* — Gregory C Issing
(74) *Attorney, Agent, or Firm* — Alston & Bird LLP

(57) ABSTRACT

A beam-forming network having: a plurality ($N_I$) of input signal ports (IP); a plurality ($N_O$) of output signal ports (OP); a weighting and interconnecting network (WIN) comprising a plurality of signal dividers (SD), phase and amplitude weighting elements (WE), switches (SW1, SW2) and signal combiners (SC), for associating each input port to output ports through respective weighting units; wherein either input (IP) or output (OP) ports, or both, are partitioned into disjoint equivalence classes (IEC, OEC), at least a majority of said equivalence classes having more than one port; and in that the network is either configured in order to associate each input port to at most one output port for each output equivalence class, or to associate each output port to at most one input port for each input equivalence class, or both. Also provide is a multibeam antenna comprising having such a beam-forming network, and an electronic circuit for implementing such a beam-forming network.

27 Claims, 17 Drawing Sheets

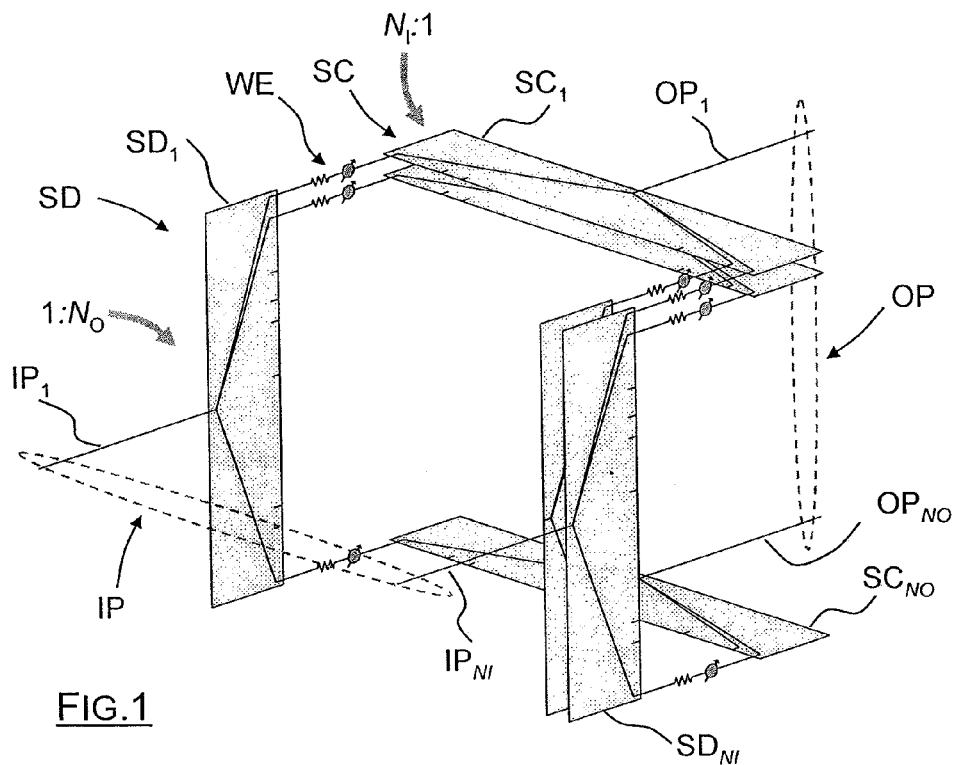
FIG.1
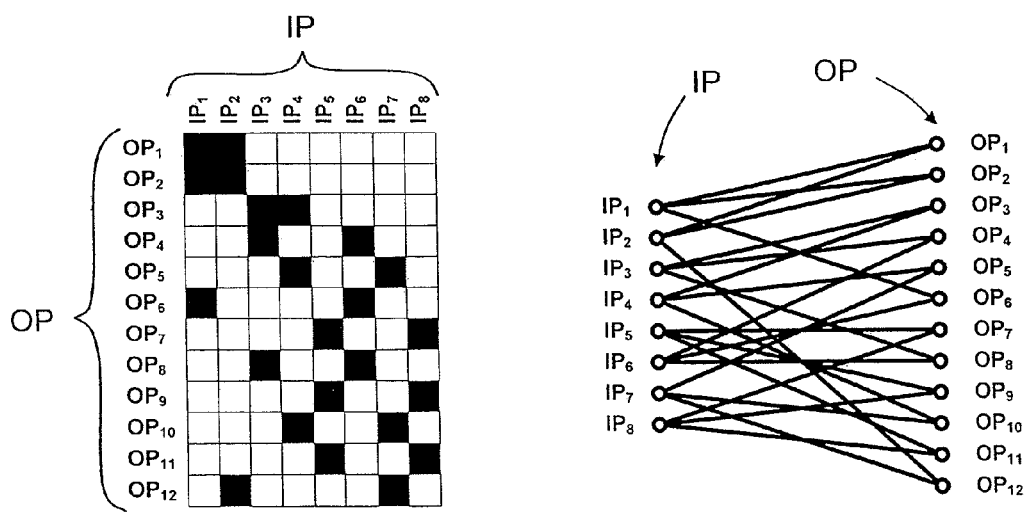
FIG.2
FIG.3

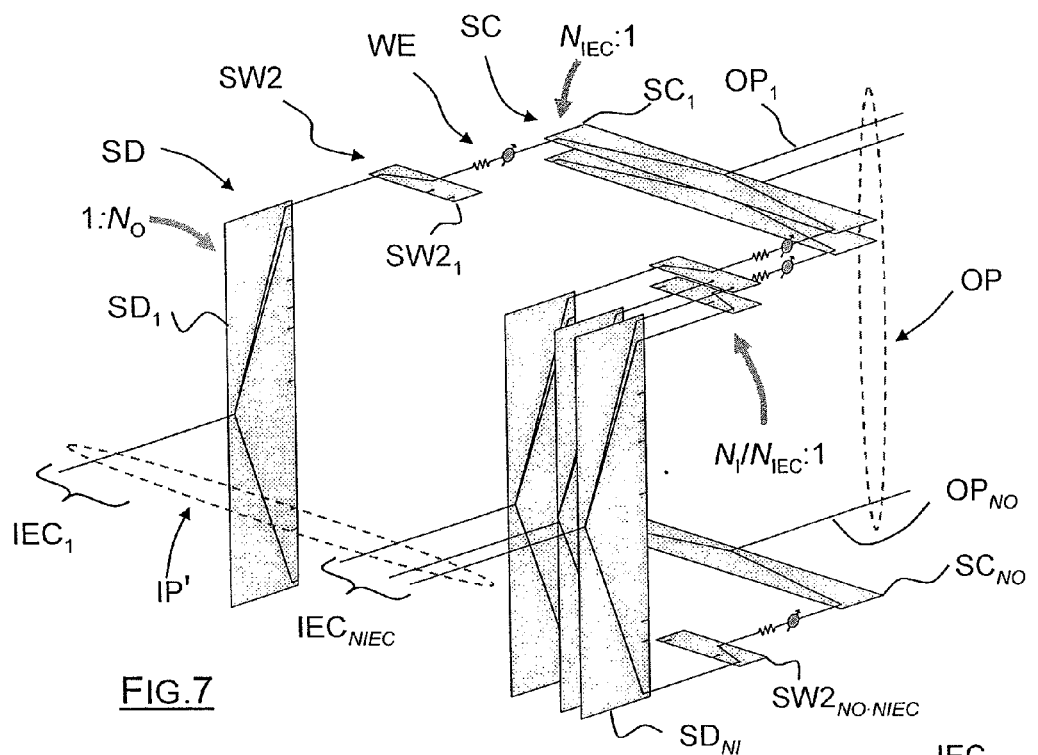
FIG.7
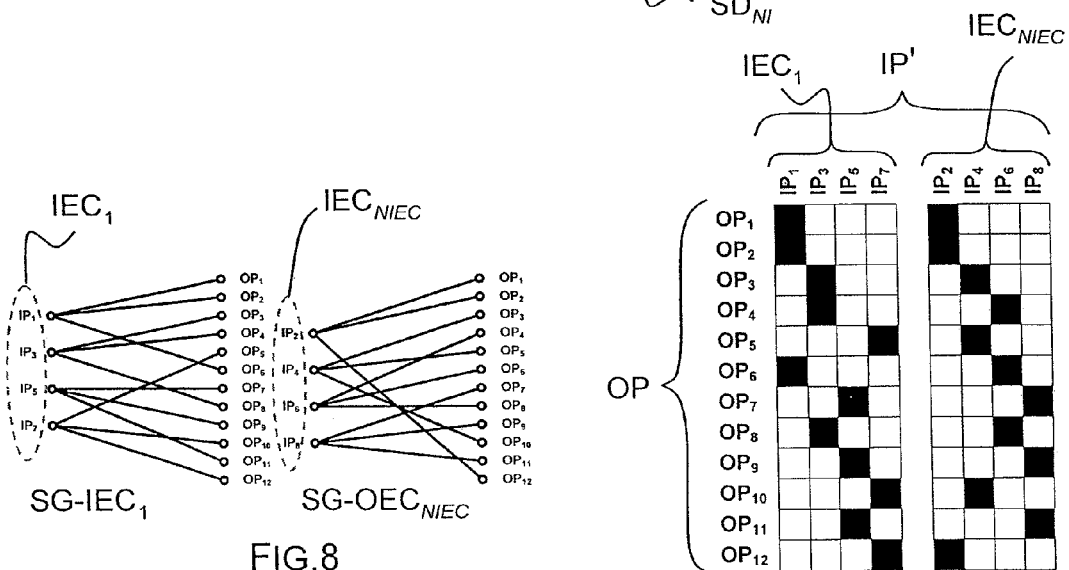
FIG.8
FIG.9

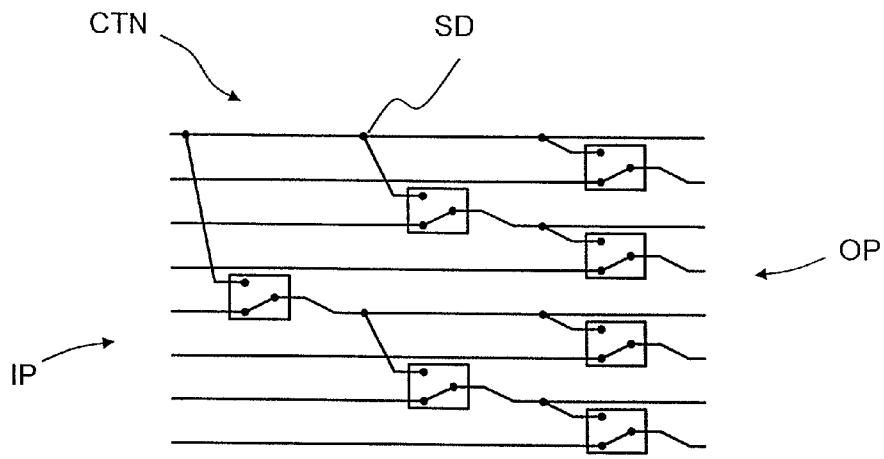
FIG.21A
FIG.21B
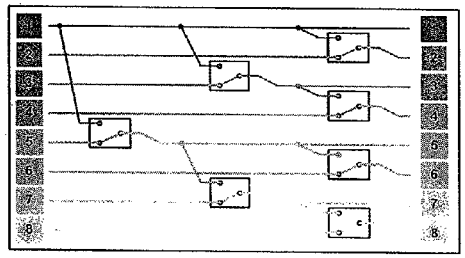
FIG.21C
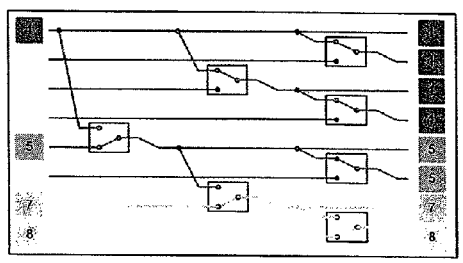
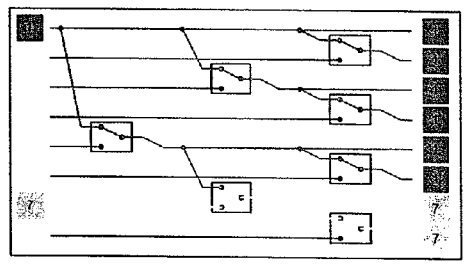
FIG.21D
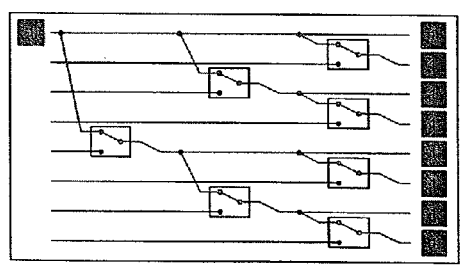
FIG.21E

B₁

B₅

B₂

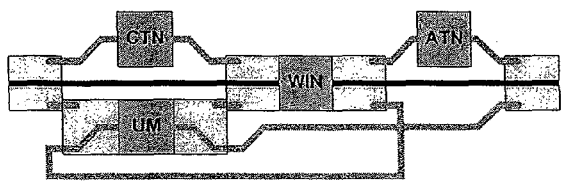 
FIG.36A  FIG.37A
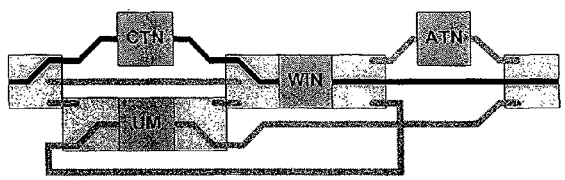 
FIG.36B  FIG.37B
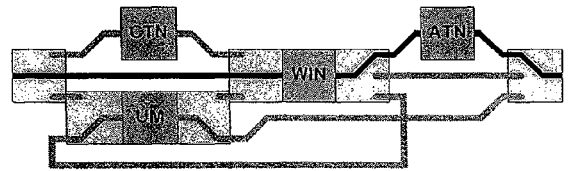 
FIG.36C  FIG.37C
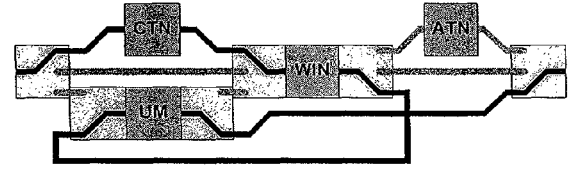 
FIG.36D  FIG.37D
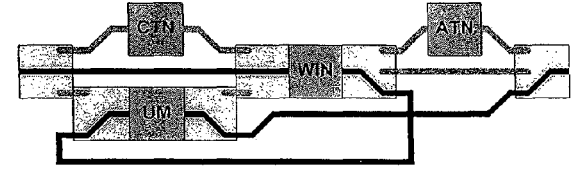 
FIG.36E  FIG.37E
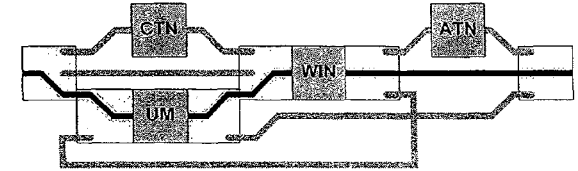 
FIG.36F  FIG.37F

RECONFIGURABLE BEAM-FORMING-NETWORK ARCHITECTURE

FIELD OF THE INVENTION

The invention relates to a reconfigurable beam-forming network, to an electronic circuit implementing it and to a multibeam array antenna comprising such a beam-forming network.

The invention applies in particular to the fields of satellite communications, remote sensing and global navigation systems.

BACKGROUND OF THE INVENTION

A Beam Forming Network (BFN) constitutes the heart of any array antenna system, i.e. of any antenna system relaying on a set of radiating elements to generate one or more beams. It plays an essential role in different antenna architectures ranging from direct radiating arrays (DRAs) to the vast set of Array-Fed Reflector (AFR) antennas, including Semi-Active Multi-Matrix, Imaging or others configurations.

More specifically, a Beam Forming Network performs the functions of:

in an emitting antenna array, focusing the energy radiated by an array along one or more predetermined directions in space by opportunely phasing and weighting the signals feeding the radiating elements of the array; and in a receiving antenna array, synthesizing one or more receiving lobes having predetermined directions in space by opportunely phasing and weighting the signals received by the antenna elements of the array.

Multibeam array antennas find application in communications, remote sensing (e.g. real and synthetic RF instruments such as radars, radiometers, altimeters, bi-static reflectometry and radio occultation receivers for signals-of-opportunity missions, etc.), electronic surveillance and defense systems (e.g. air traffic management and generally moving target indicator radars, electronic support measure and jamming systems for electronic warfare, RF instruments for interference analysis and geo-location, etc.), science (e.g. multibeam radio telescopes), satellite navigation systems (where multibeam antennas can be employed in the user and control segment and could, as well, extend space segment capabilities).

In satellite communication systems, array antennas are required to perform two major classes of coverage:

Multiple Contoured Beams, for the development of broadcasting/multicasting services based on linguistic zones consisting of differently sized and shaped geographical regions; and Multiple Spots in a cellular-like configuration, especially for point-to-point services making available higher gains and thus relaxing user terminals requirements.

Telecommunication satellites have an ever-increasing operational lifespan, and business conditions are subject to unpredictable changes. Therefore, there is a need for reconfigurability of multibeam array antennas in order to move beams in space and/or deal with changes in the satellite orbits.

A single-beam BFN for application to an Array Fed Reflector is described in the article of T. E. Sharon, "Beam Forming Networks for mm-Wave Satellite Communications", Microwave Journal, August 1983. In the described application a spot beam must be generated with scanning flexibility over the Earth coverage. The number of radiating elements to be fed is instantaneously limited to only a portion of the number of elements which constitute the full array, and only amplitude tapering is required. The author shows that the number of amplitude control elements (variable power dividers) can be reduced at the expense of an increased number of switches. The proposed BFN employs a reduced number of variable power dividers to illuminate a cluster of radiating elements, and the position of the cluster can be selected by setting switch positions on the output section.

This configuration was implemented for the beam hopping antenna of the NASA Advanced Communications Technology Satellite (ACTS), as reported in the paper of F. A. Regier "The ACTS multibeam antenna", IEEE Transaction on Microwave Theory and Techniques, Vol. 40, No 6, pp 1159-1164, June 1992.

Another example of the use of switches to avoid the need of having variable phase shifters in number equal to the number of radiating elements is described by J. L. Butler, "Digital, matrix, and intermediate frequency scanning", in R. C. Hansen "Microwave Scanning Antennas", Vol. 3, Academic Press 1966 The author describes a single-beam linear phased array composed by N radiating elements, able to steer a single beam toward N equispaced beam directions.

The above-described BFNs are limited to the generation of a single instantaneous beam, and their only form of reconfigurability is represented by some capability of re-pointing said beam, by continuous steering or discrete hopping.

U.S. Pat. No. 3,255,450 to J. L. Butler describes a fixed multiple-beam BFN based on the use of so-called "Butler matrices". A Butler matrix is a lossless multiport network having N inputs and N outputs. The excitation of a single input induces equal amplitude signals on all the outputs, with a linear phase progression across the array. Therefore, each of the N input ports give rise to an independent directive beam. The strategy that allows reducing the complexity of the BFN consists in factorizing the whole network in lower order networks. A systematic design procedure for a square network with a number of input/output ports equal to a power of 2 leads to a number of hybrids and of fixed phase shifters equal, respectively, to $$\frac{N}{2}\log_2 N \text{ and } \frac{N}{2}(\log_2 N - 1),$$

while a non-factorized N×N BFN is composed by ~$N^2$ power dividers and phase shifters. This complexity reduction is directly equivalent to that obtained, in the field of digital signal processing, by using the Fast Fourier Transform (FFT) algorithm to evaluate the Discrete Fourier Transform (DFT), and indeed the Butler matrix can be seen as an analog implementation of the FFT.

The main limitation of this BFN is its lack of reconfigurability.

A "fully reconfigurable" BFN driving $N_E$ antenna elements for generating $N_B$ independent beams with maximum flexibility would require $N_B$ signal dividers (or combiners, in receiving application) of order 1:$N_E$, $N_B$ signal combiners (or dividers, in receiving application) of order $N_B$:1 and, most of all, $N_E \times N_B$ variable attenuators and phase shifters. The complexity of such a network would make it impractical for many applications: simpler solutions retaining sufficient (although not complete) flexibility are therefore necessary.

To take advantage of the complexity savings offered by the Butler's approach, hybrid architectures based on a combination of one or more fixed FFT-like BFNs and of a Reconfigurable BFN with reduced complexity have been proposed. See, for example, U.S. Pat. No. 6,295,026 to C.-H. H. Chan et al. for a reconfigurable BFN adapted to a direct radiating array, and U.S. Pat. No. 5,115,248 to A. Roederer for a reconfigurable BFN for a focused array including multiport amplifiers (known as the "multi-matrix" architecture).

The complexity saving provided by these solutions is, however, insufficient for many applications, particularly in the field of telecommunications.

Moreover, each BFN architecture known from prior art is tailored to a specific antenna architecture (e.g. direct-radiating vs. focused).

An additional drawback of the prior art architectures is that the digital implementations of transmit and receive BFN may be drastically different from each other: this is due to the fact that digital signal dividers and combiners, unlike their analog counterparts, are intrinsically non-reciprocal devices and have completely different structures and implementations.

SUMMARY OF THE INVENTION

An aim of the invention is to provide an efficient, modular and scalable design solution for reconfigurable BFNs capable of supporting various multi-beam configurations.

Another aim of the invention is to provide a reconfigurable BFN architecture which can be easily adapted to several possible antenna architectures.

Still another aim of the invention is to provide a reconfigurable BFN architecture which can be used both in transmission and in reception, even in the case of digital implementation.

A beam-forming network according to the invention comprises: a plurality of input ports for inputting respective transmit beam or receiving antenna signals; a plurality of output ports issuing respective transmit antenna or receive beam signals; and a Weighting and Interconnecting Network (WIN)—typically comprising a plurality of signal dividers, phase and amplitude weighting units, switches and signal combiners—for associating each input port to output ports through respective weighting units; and is characterized in that output ports are partitioned into disjoint output equivalence classes (OEC), at least a majority of said equivalence classes comprising more than one output port; and in that the network is configured in order to associate each input port signal to at most one output port for each output equivalence class).

Alternatively, the Weighting and Interconnecting Network is characterized in that input ports are partitioned into disjoint input equivalence classes (IEC), at least a majority of said equivalence classes comprising more than one input port; and in that the network is configured in order to associate each output port signal to at most one input port for each input equivalence class Preferably, both input and output ports are partitioned into disjoint equivalence classes (IEC and OEC), at least a majority of said equivalence classes comprising more than one port; and the Weighting and Interconnecting Network is also configured in order to associate each input port of each inputs equivalence class to at most one output port of each equivalence class of outputs.

Particular embodiments of such a beam-forming network, particularly adapted to array-fed, "multi-matrix" or direct-radiating antenna arrays, constitute the object of the dependent claims.

Another object of the invention is a reconfigurable, multi-beam antenna array comprising a beam-forming network as described above, and an array constituted by a plurality of antenna elements organized in a lattice and connected to the ports of the beam-forming network. Again, dependent claims are directed to particular embodiments of such an antenna array.

Still another object of the invention is an electronic circuit, preferably in the form of an Application Specific Integrated Circuit (ASIC) implementing such a beam-forming network.

BRIEF DESCRIPTION OF THE DRAWINGS

Additional features and advantages of the present invention will become apparent from the subsequent description, taken in conjunction with the accompanying drawings, which show:

FIG. 1, the topology of a fully-interconnected BFN, showing maximal reconfigurability but high complexity;

FIG. 2, an example of a BFN transfer matrix with reduced input/output port interconnections FIG. 3, a bipartite graph representing the connectivity of the transfer matrix of FIG. 3;

FIGS. 5, 8 and 11, the concept of bipartite graph decomposition, as applied to the bipartite graph of FIG. 3;

FIGS. 6, 9 and 12, the effect of the decomposition of the input and/or output ports in equivalence classes on the BFN transfer matrix;

FIG. 7, the topology of a reconfigurable BFN according to a second embodiment of the invention;

FIGS. 21A-21E, a multicasting switching network (CTN) used in a reconfigurable BFN according to a forth embodiment of the invention;

FIGS. 36A-36F and 37A-37F, different configurations of the electronic circuit of FIG. 35 and equivalent flow diagrams, respectively.

DETAILED DESCRIPTION

Figure 4:
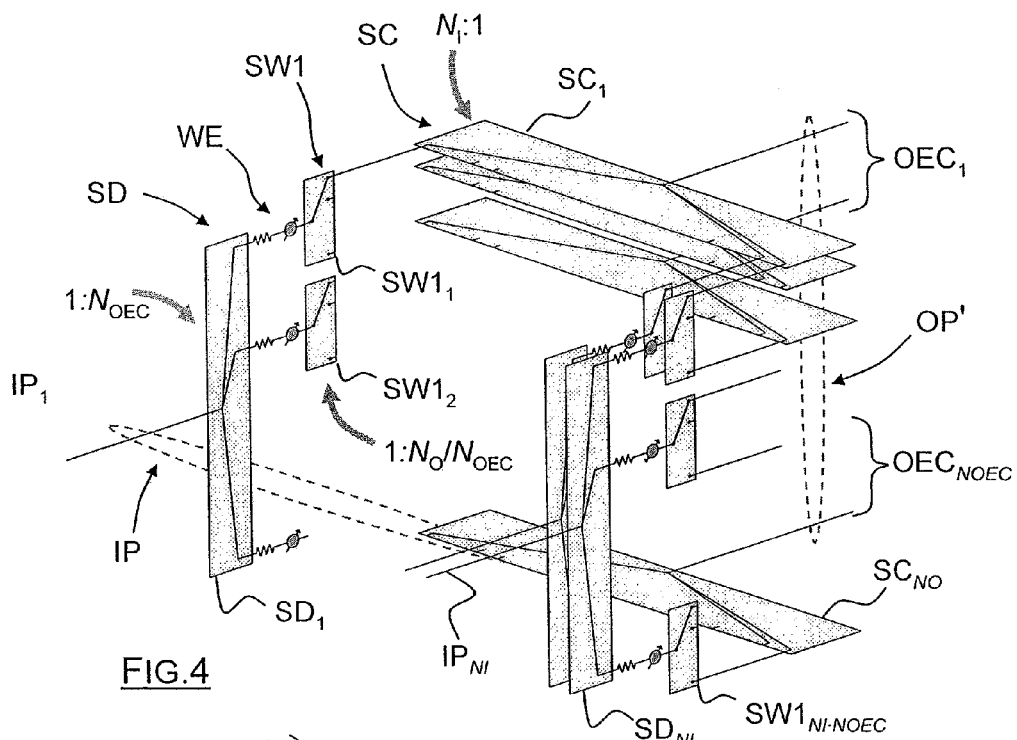
FIG. 4, the topology of a reconfigurable BFN according to a first embodiment of the invention.

FIG. 1 represents a fully interconnected multi-beam BFN having $N_I$ input ports IP, labelled $IP_1$-$IP_{NI}$, and $N_O$ output ports OP, labelled $OP_1$-$OP_{NO}$. If this BFN is configured to operate in transmit mode, up to $N_B \leq N_I$ distinct beam signals are present at the input ports, and $N_O$ output signals, corresponding to respective linear combinations of the input signals, are present at the output port; according to the laws of electromagnetism, the antenna elements (not represented) fed by the output port signals generate, in the far field, up to $N_B = N_I$ separate beams, one for each input beam signal. Conversely, if the BFN is configured to operate in receive mode, up to $N_E \leq N_I$ input signals are received at the input ports from the respective antenna elements (not represented); up to $N_O$ different linear combinations of these inputs are generated and provided at the output port; according to the laws of electromagnetism, each linear combination of the input signals correspond to a synthesized receive lobe having a specified orientation in space.

Unless specified otherwise, the case of an emitting BFN will be considered in the following.

The BFN of FIG. 1 comprises a first layer SD of $N_I$ signal dividers $Sa_1$-$SD_{NI}$ each having one input, connected to a respective input port, and $N_O$ outputs; $N_O \cdot N_I$ phase and amplitude weighting elements WE (e.g. variable attenuators and phase shifters) connected at the output of the signal dividers; and a second layer SC of $N_O$ signal combiners $SC_1$-$SC_{NO}$ each having $N_I$ inputs, connected to said weighting element, and one output, connected to a respective output port.

As discussed above, this BFN has maximal reconfigurability, but its complexity makes it impractical for many applications.

From a mathematical point of view, the relationship between signals at the input ports and signals at the output ports can be expressed by the equation:

$$y = Tx$$

Where x is the ($N_I \times 1$) input signal vector, y is the ($N_O \times 1$) output signal vector and T is the ($N_O \times N_I$) transfer matrix, representing the weighting elements WE.

The transfer matrix contains all the information relevant to the BFN topology and, in reconfigurable BFNs, it describes the current realization of the weighting law, among the several different realizations defining the whole flexibility range. As the BFN of FIG. 1 is "fully interconnected" (i.e. each input port is connected to all the output ports and vice-versa), all the elements of the transfer matrix T can be different from zero.

Networks having a reduced connectivity are represented by sparse matrices, having a great number of null elements. This condition arises whenever a limited number of antenna elements is necessary to form a beam (i.e. the number of antenna elements per beam is less than the total number of antenna elements—$N_{EPB} < N_E$) and/or each antenna element participate to the formation of a limited number of beams (i.e. the number of beams per antenna element is less than the total number of beams—$N_{BpE} < N_B$). FIG. 2 shows an example of a T matrix of a BFN requiring reduced interconnectivity (non-null entries of the matrix are shown as black squares).

The BFN topology can also be defined by means of a weighted bipartite graph. A bipartite graph, also called a "bigraph", is a well-known concept of combinatorial theory, and can be defined as a graph whose nodes (or vertices) form two disjoint sets, such that no two graph nodes within the same set are interconnected. In other words, left-hand nodes—representing input ports—are interconnected only to right-hand nodes—representing output ports—and vice versa. Each edge connecting a left-hand node to a right-hand node is characterized by a weight, representing the corresponding weighting element of the transfer matrix T.

In the BFN of FIG. 1, all the input ports are connected to all the output ports and vice versa; therefore, the corresponding bipartite graph is a "complete" bipartite graph, also called a "biclique".

FIG. 3 represents an incomplete (i.e. not fully interconnected) bipartite graph as resulting from the BFN transfer matrix of FIG. 2.

In order to ease the understanding of the invention, it is useful to conceptually separate the interconnectivity issue from the weighting operation by decomposing the weighted bipartite graph representing a BFN in an un-weighted bipartite graph (operating the connectivity) and a set of multiply/add weighting elements. Moreover, it is possible to consider only oriented graphs, wherein the left-hand nodes represent inputs and the right-hand nodes represent outputs.

The present invention is based on the observation that the structural complexity of the bipartite graph of FIG. 3 is due to the facts that:
    input nodes are connected to multiple edges, thus requiring multicast (i.e. one-to-many) capabilities; and that
    output nodes are the ends of multiple edges, thus requiring concast (i.e. many-to-one) capabilities.

On the other side, a graph showing simple "matching" could lead to a simple realization by mean of a non-multicasting/non-concasting crossbar interconnection network (a "matching" is a set of edges such that no two edges share the same node). If an edge (k, n) is in the matching, then nodes k and n are said to be matched. The maximum matching of a bipartite graph represents the equivalent routing capacity of the network without any multicasting and/or concasting. A perfect matching of a graph is a matching such that all nodes are matched.

Multicasting and concasting issues of an interconnection network can be tackled by graph augmentation: to avoid the multicast/concast interconnection conflicts, the input and output nodes are duplicated such that the resultant graph shows simple matching.

Considering all the interconnectivity possibilities, the augmentation can lead to an oversized structure with a maximum matching exceeding the required interconnectivity needs.

In the framework of the invention graph augmentation has to be understood as an increase of the left nodes and/or of the right nodes of the bipartite graph representing the BFN. Signal divider SD and signal combiner SC implement the function of input nodes augmentation and output nodes augmentation, respectively.

The BFN of FIG. 1 can be understood in the context of graph augmentation as a configuration implementing the maximal augmentation of input and output nodes resulting in a total of $N_I \times N_O$ sub-graphs each with only one left node and only one right-node, clearly simply matched; the overall interconnection capacity is $N_I \times N_O$, often exceeding BFN interconnection needs.

The most efficient architecture should show the smallest augmentation with perfect matching of capacity exactly corresponding to the actual interconnection needs; with the terminology of the graph theory the most efficient architecture is a solution of the graph augmentation problem. For sake of clarity it is recalled that the graph augmentation problem is the problem of adding as few nodes as possible to the graph such that the resulting graph satisfies a given connectivity requirement.

The present invention provides with a general node partitioning scheme that can be shown to optimally solve the reconfigurable BFN graph augmentation problem with beneficial effects on the complexity reduction of the BFN architecture (and relevant hardware), and leads to a unified treatment of different beam-forming configurations.

According to the invention:
First of all, the right-hand nodes of the bipartite graph are appropriately partitioned into a nonintersecting set of element classes (Output Equivalence Classes—OEC), which will allow a first graph augmentation in a set of non-left-colliding graphs (left nodes augmentation factor equal to the number of Output Equivalence Classes—$N_{OEC}$) each with a same number of left-hand nodes but with a reduced number of right-hand nodes for each graph. The Output Equivalence Classes need not comprise a same number of output ports (although it is preferable that at least a majority of them does); however, it is necessary that at least a majority of classes comprises more than one element, otherwise no complexity reduction of the BFN would be achieved.

Secondly, the left-hand nodes of the initial bipartite graph can also be appropriately partitioned into a non-intersecting set of element classes (Input Equivalence Classes—IEC), which allows a second graph augmentation into a set of non-right-colliding graphs (right nodes augmentation factor equal to the number of Input Equivalence Classes—$N_{IEC}$) each with a same number of right-hand nodes but with a reduced number of left-hand nodes for each graph. The Input Equivalence Classes need not comprise a same number of input ports (although it is preferable that at least a majority of them does); however, it is necessary that at least a majority of classes comprises more than one element, otherwise no complexity reduction of the BFN would be achieved.

Thirdly the second partition can be applied to the augmented graphs of the first partition (the reciprocal is also true) in order to achieve an overall structure which exhibits the largest symmetry and the most efficient use of the resources.

Figures 5, 6:
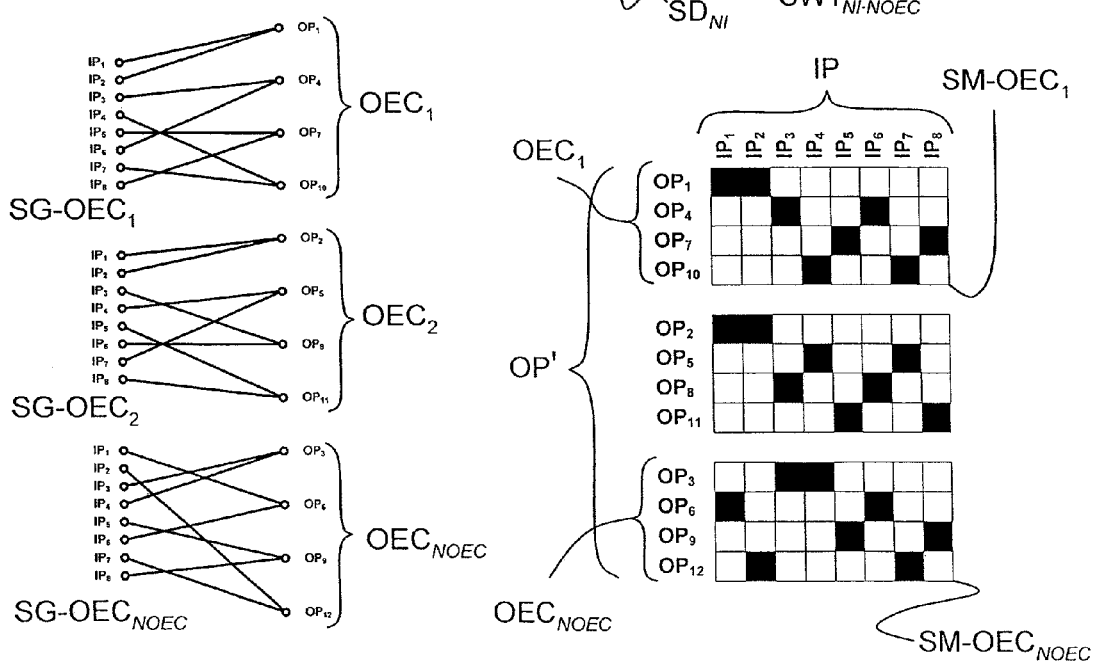

The above-described first partitioning has the property of decomposing the full bipartite graph of a Beam-Forming Network (e.g. the graph of FIG. 3) in a set of left-hand non-colliding bipartite graphs in number equal to the number of output equivalence classes $N_{OEC}$. For example, FIG. 5 represents a decomposition of the graph of FIG. 3 in left-hand non-colliding bipartite sub-graphs, labelled SG-OEC$_1$-SG-OEC$_{NOEC}$, corresponding to three output equivalence classes ($N_{OEC}$=3). Otherwise stated, in the sub-graphs of FIG. 5, the right-hand nodes of each sub-graph correspond to output ports belonging to a same output equivalence class, labelled OEC$_1$ OEC$_{NOEC}$.

It is worth noting that the superposition of these three graphs of FIG. 5 returns the original graph of FIG. 3 but, being the number of right hand nodes of the sub-graphs of smaller number, a simplification of the interconnectivity of each sub-graph is obtained with a relevant complexity reduction.

This simplification can also be understood inspecting the transfer matrix resulting from a reordering of the output port from the initial set OP to OP' where output ports belonging to a same output equivalence class are listed consecutively. The reordered transfer matrix can be decomposed in $N_{OEC}$ sub matrices, labelled SM-OEC$_1$-SM-OEC$_{NOEC}$ with each sub-matrix having a single non-null weight for each column.

FIG. 4 represents a multi-beam BFN accordingly to the first partitioning described above. The network has $N_I$ input ports IP, labelled IP$_1$-IP$_{NI}$, and $N_O$ output ports OP' partitioned in $N_{OEC}$ output equivalence classes labelled OEC$_1$-OEC$_{NOEC}$. In general each output equivalence class OEC$_p$ can comprise a different number of output ports QO$_p$; block diagram of FIG. 4 and output port partitioning of FIGS. 5 and 6 show examples of output equivalence classes with the same number of output ports (QO$_p$=$N_O$/$N_{OEC}$).

Input ports and output ports of the BFN are connected by an interconnecting and weighting network WIN comprising:
A first layer SD of $N_I$ signal dividers SD$_1$-SD$_{NI}$ of order 1:$N_{OEC}$, each connected to a respective input port, $N_{OEC}$ being the number of equivalence classes of output ports, i.e. the number of equivalence classes in which antenna elements (in a transmit configuration) or the beams (in a receive configuration) are partitioned;
$N_I \cdot N_{OEC}$ amplitude and/or phase weighting elements WE, each connected to a separate output of said signal dividers;
A layer SW1 of $N_I \cdot N_{OEC}$ switches SW1$_1$-SW1$_{NI \cdot NOEC}$ of order 1:($N_O$/$N_{OEC}$), the single input of each switch being connected to a respective one of said weighting elements; and
A layer SC of $N_O$ signal combiners of order $N_I$:1, each connecting an output port to $N_I$ outputs of $N_I$ different switches of layer SW1.

The signal combiners SC$_1$-SC$_{NO}$ which are associated to output ports belonging to a same output equivalence class are connected to different outputs of the same $N_I$ switches SW1$_1$-SW1$_{NI \cdot NOEC}$. This ensures that each input port is associated to at most one output port for each output equivalence class, in accordance with the decomposition of the transfer matrix in sub-matrices with at most a single entry for each column.

In the most general case output equivalence class OEC$_p$ has QO$_p$ output ports, QO$_p$ associated signal combiners of order $N_I$:1 and $N_I$ associated switches of order 1:QO$_p$. This is equivalent to a decomposition of the transfer matrix in sub-matrices SM-OEC$_p$ of size (QO$_p \times N_I$).

It is recalled that partitioning of the output ports in equivalence classes is such that for each sub-matrix a column corresponding to a same input port has at most a non null entry (corresponding to a single weighting element). This implies that at most $N_{OEC}$ weights can be applied to an input port signals. Consequently $N_{OEC}$ expresses:
in transmission: the maximum number of antenna elements that can participate to form a beam (i.e. Number of Elements per Beam—$N_{EpB}$)
in reception: the maximum number of beams to which an antenna element can contribute (i.e. Number of Beams per Element—$N_{BpE}$)

Conversely, given the antenna design, $N_{OEC}$ must be selected such that $N_{OEC} \geq N_{EpB}$ (in transmission) and/or $N_{OEC} \geq N_{BpE}$ (in reception); maximal efficiency is achieved when the equality holds.

Let us consider the use of the WIN as a transmit BFN. A beam signal is injected into the BFN from input port $IP_1$ and destined to form a first radiated beam having a particular direction in space. The first signal divider $SD_1$ divides this signals in $N_{OEC}$ sub-signals (with $N_{OEC} \geq N_{EpB}$) each of them being appropriately weighted (in amplitude and phase) by corresponding weighting elements WE.

Let us now consider the first sub-signal, exiting the uppermost output port of signal divider $SD_1$. Switch $SW1_1$ selectively directs (through a respective signal combiner) this sub-signal to one output port chosen in the subset $OEC_1$; said subset of ports corresponds, in fact, to an equivalence class.

In a similar way, the second sub-signal of the first beam signal is selectively connected by a second switch $SW1_2$ to one output port chosen in the subset $OEC_2$, corresponding to a second equivalence class, and so on.

It is clear that, in these conditions, the first beam signal can only be connected to one element per equivalence class. Otherwise stated, only one antenna element per equivalence class contributes to the formation of the first beam. From a graph-theoretical point of view, in each sub-graph left-hand collisions (multicasting) are avoided.

Signals injected into the BFN from other beam ports are associated to antenna ports in the same way. Due to signal combiners SC, a single antenna element can contribute to the formation of several different beams. From a graph-theoretical point of view this means that right-hand collisions (concasting) are admitted, as it can be seen on FIG. 5. Equivalently the sub-matrices can have rows with more than one non-null entry, as can be seen on FIG. 6.

Implementation complexity of the BFN of FIG. 4 is much lower than that of the "fully interconnected" network of FIG. 1: in particular, the number of weighting elements WE is reduced by a factor $N_O/N_{OEC}$ (i.e. up to $N_E/N_{EpB}$ in transmit and $N_E/N_{BpE}$ in receive). The "flexibility", i.e. the reconfigurability capability, of the BFN of FIG. 4 is slightly reduced with respect to that of the fully interconnected network, but remains more than sufficient for the great majority of practical applications.

As above-described, a second partitioning approach can be applied which has the property of decomposing the full bipartite graph of a Beam-Forming Network (e.g. the graph of FIG. 3) in a set of right-hand non-colliding bipartite graphs in number equal to the number of Input Equivalence Classes $N_{IEC}$. FIG. 8 represents a decomposition of the graph of FIG. 3 in right-hand non-colliding bipartite sub-graphs, labelled SG-IEC$_1$-SG-IEC$_{NIEC}$, corresponding to two input equivalence classes (e.g. $N_{IEC}$=2). Otherwise stated, in the sub-graphs of FIG. 8, the left-hand nodes of each sub-graph correspond to input ports belonging to a same input equivalence class, labelled IEC$_1$ IEC$_{NIEC}$.

It is worth noting that the superposition of these two graphs of FIG. 8 returns the original graph of FIG. 3 but, being the number of left hand nodes of the sub-graphs of smaller number, a simplification of the interconnectivity of each sub-graph is obtained with a relevant complexity reduction.

This simplification can also be understood inspecting the transfer matrix resulting from a reordering of the input port from the initial set IP to IP' where input ports belonging to a same input equivalence class are listed consecutively. The reordered transfer matrix can be decomposed in $N_{IEC}$ sub matrices, labelled SM-IEC$_1$-SM-IEC$_{NIEC}$ with each sub-matrix having a single non-null weight for each row.

FIG. 7 represents a multi-beam BFN according to this second partitioning. The network has $N_I$ input ports IP' partitioned in $N_{IEC}$ input equivalence classes labelled IEC$_1$-IEC-$_{NIEC}$ and $N_O$ output ports OP'. In general, each equivalence class IEC$_q$ can comprise a different number of input ports QI$_q$; block diagram of FIG. 7 and output port partitioning of FIGS. 8 and 9 show examples of input equivalence classes with the same number of input ports ($QI_q$=$N_I/N_{IEC}$).

Input ports and output ports of the BFN are connected by an interconnecting and weighting network WIN comprising:
- A first layer SD of $N_I$ signal dividers SD$_1$-SD$_{NI}$ of order 1:$N_O$, each connected to a respective input port.
- A layer SW2 of $N_O \cdot N_{IEC}$ switches SW2$_1$-SW2$_{NO \cdot NIEC}$ of order ($N_I/N_{IEC}$):1, the inputs of each switch being connected to the outputs of a series of said signal dividers all associated to the same input equivalence class;
- $N_O \cdot N_{IEC}$ amplitude and/or phase weighting elements WE, each connected to the single output of said switches;
- A layer SC of $N_O$ signal combiners of order $N_{IEC}$:1, each connecting an output port to the outputs of $N_{IEC}$ weighting elements.

The signal dividers SD$_1$-SD$_{NI}$ which are associated to input ports belonging to a same input equivalence class (of dimension $N_I/N_{IEC}$) are connected to different inputs of the same $N_O$ switches SW2$_1$-SW2$_{NO \cdot NIEC}$. This ensures that each output port is associated to at most one input port for each input equivalence class, in accordance with the decomposition of the transfer matrix in sub-matrices with at most a single entry for each row.

In the most general case input equivalence class IEC$_q$ has QI$_q$ input ports, QI$_q$ associated signal dividers of order 1:$N_O$ and $N_O$ associated switches of order QI$_q$:1. This is equivalent to a decomposition of the transfer matrix in sub-matrices SM-IEC$_q$ of size ($N_O \times QI_q$).

The BFN of FIG. 7 exhibits a reduction of the number of weighting elements WE by a factor $N_I/N_{IEC}$ (i.e. up to $N_B/N_{BpE}$ in transmit and $N_E/N_{EpB}$ in receive) with respect to the fully interconnected BFN of FIG. 1. The reconfigurability capability of the BFN of FIG. 7 is slightly reduced with respect to that of the fully interconnected network, but remains more than sufficient for the great majority of practical applications.

The implementation complexity of a BFN according to the invention can be further reduced by applying the equivalence class partitioning concept both to input and output ports. Of course, this additional simplification comes at the expense of an additional (but very often acceptable) reduction of the reconfiguration capabilities.

Figure 11:
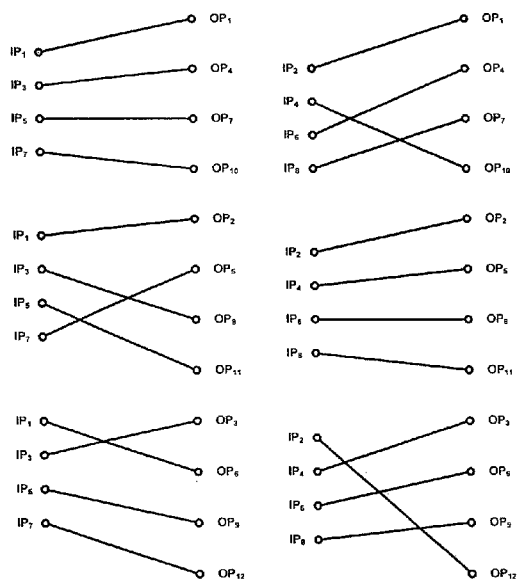

From a graph-theoretical point of view, the idea consists in further partitioning the right-hand colliding sub-graphs of FIG. 5, or the left-hand colliding sub-graphs of FIG. 8, into non-colliding bipartite sub-graphs exhibiting, in the most efficient implementation, perfect matching, as illustrated on FIG. 11.

Otherwise stated, in a BFN according to the graph partition represented on FIG. 11, input ports and output ports are partitioned into disjoint equivalence classes (at least a majority of which comprises more than one port) and each input port of each equivalence class of inputs (IEC) can be associated to at most one output port of each equivalence class of outputs (OEC), and vice versa.

This partitioning is beneficial from two points of view. First of all, as discussed above, the implementation complexity is reduced. Moreover, due to the fact that input ports are partitioned in classes as are the output ports, the non-colliding bipartite graphs representing the BFN topology show complete left/right symmetry; this allows using a same BFN in reception (i.e. antenna elements are connected to the input ports and beam signals are issued by the output ports) as well as in emission (input ports are fed by beam signals and output ports are connected to the radiating antenna elements), even if it comprises non-reciprocal elements (as in the case of digital implementation).

Figure 10:
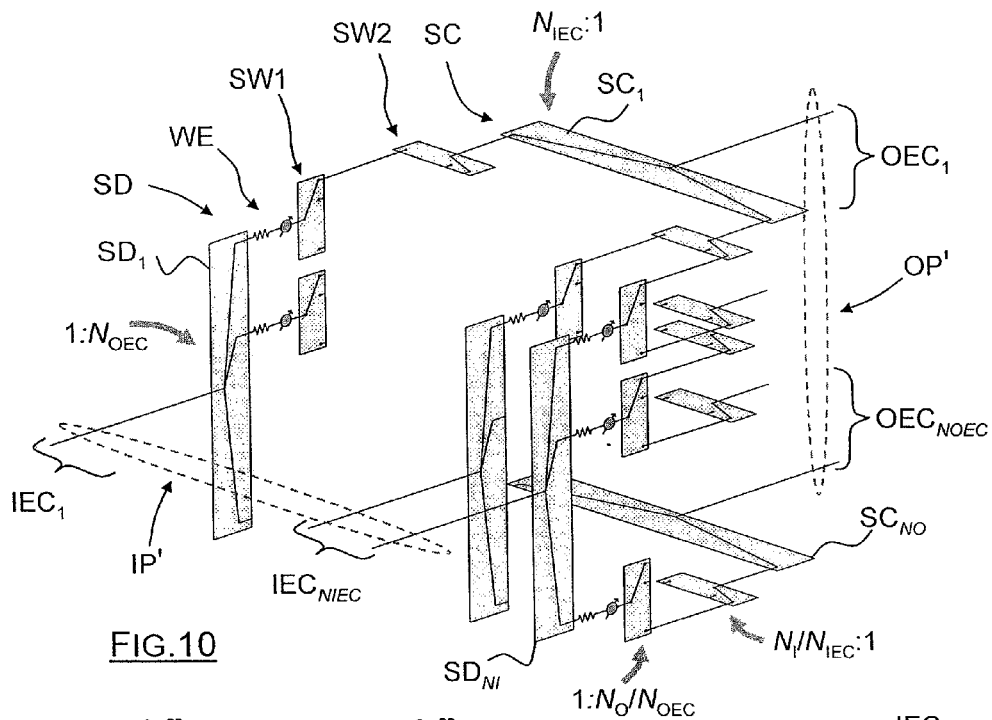
FIG. 10, the topology of a reconfigurable BFN according to a third embodiment of the invention.

FIG. 10 represents a multi-beam BFN having $N_I$ input ports IP', labelled IP'$_1$-IP'$_{NI}$, and $N_O$ output ports OP', labelled OP'$_1$-OP'$_{NO}$, wherein both the input ports and the output ports are partitioned in equivalence classes in order to avoid concasting as well as multicasting.

More particularly, the $N_I$ input ports are partitioned into $N_{IEC}$ input equivalence classes, labelled IEC$_1$-IEC$_{NIEC}$; each input equivalence class IEC$_q$ can comprise a different number of input ports QI$_q$. As well, the $N_O$ output ports are partitioned into $N_{OEC}$ equivalence classes, labelled OEC$_1$-OEC$_{NOEC}$; each output equivalence class OEC$_p$ can comprise a different number of output ports QO$_p$.

Generally, it is not necessary that all the equivalence classes comprise a same number of elements (greater than one), although it is preferred that at least a majority of them does. If necessary, fictitious ports can be introduced in order to make the equivalence classes equipotent (i.e. iso-dimensional).

Figure 12:
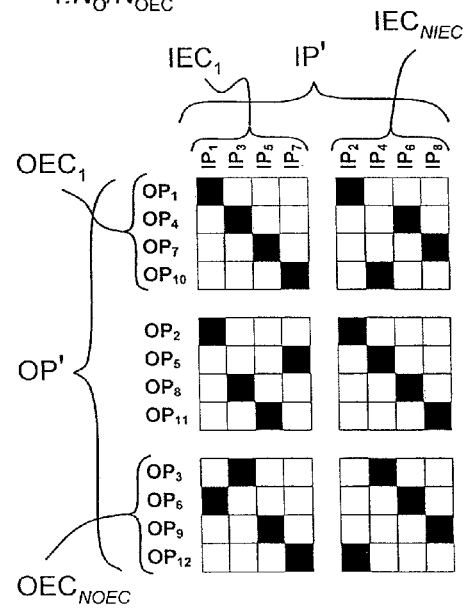
Figure 13:
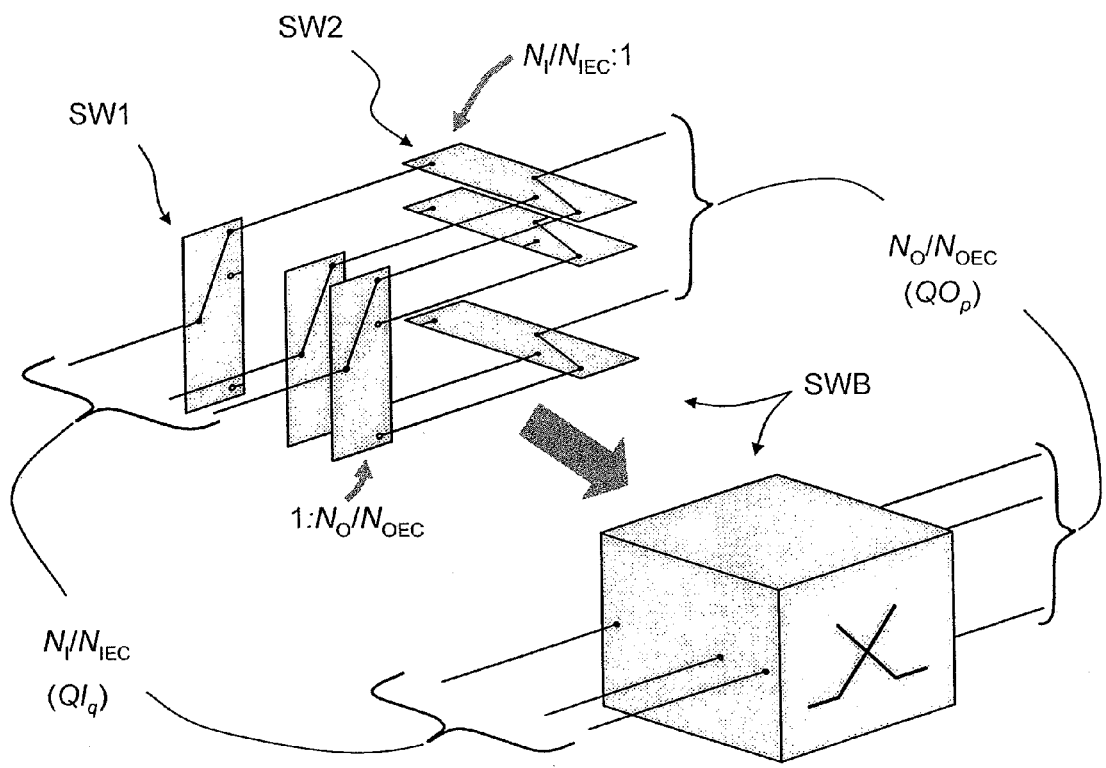
FIG. 13, an implementation detail of a switching bloc SWB of the BFN of FIG. 10.

Block diagram of FIG. 10 and input/output port partitioning of FIGS. 11 and 12 show examples of iso-dimensional input/output equivalence classes, respectively, QI$_q$=$N_I$/$N_{IEC}$, QO$_p$=$N_O$/$N_{OEC}$.

The weighting and interconnecting network WIN of FIG. 10 comprises:

A first layer SD of $N_I$ signal dividers SD$_1$-SD$_{NI}$ of order 1:$N_{OEC}$, each connected to a respective input port (like the WIN of FIG. 4);

$N_I \cdot N_{OEC}$ amplitude and/or phase weighting elements WE, each connected to a separate output of said signal dividers (like the WIN of FIG. 4);

A first layer SW1 of $N_I \cdot N_{OEC}$ switches SW1$_1$-SW1$_{NI \cdot NOEC}$ of order 1:($N_O$/$N_{OEC}$), the single input of each switch being connected to a respective one of said weighting elements (again, like the BFN of FIG. 4);

a second layer SW2 of $N_O \cdot N_{IEC}$ switches SW2$_1$-SW2$_{NO \cdot NIEC}$ of order ($N_I$/$N_{IEC}$):1, the multiple inputs of each switch of the second layer being connected to respective outputs of switches of the first layer; and $N_O$ signal combiners SC of order $N_{IEC}$:1, each connecting an output port to $N_{IEC}$ single outputs of respective switches of the second layer.

FIG. 10 shows $N_I \cdot N_{OEC}$ weighting elements WE connected to outputs of signal dividers SD (like the WIN of FIG. 4). A different embodiment (not shown) of the WIN of FIG. 10 foresees $N_O \cdot N_{IEC}$ weighting elements WE connected to the single output of the second layer of switches SW2 (like the WIN of FIG. 7).

Let us now consider the general interconnection between input ports belonging to a same input equivalence class IEC$_q$ (of dimension QI$_q$) and the output ports belonging to a same output equivalence class OEC$_p$ (of dimension QO$_p$). Homologue output ports of signal dividers SD which are associated to input ports belonging to IEC$_q$ are each connected to QI$_q$ switches SW1 (of order 1:(QO$_p$)); homologue output ports of the QI$_q$ switches SW1 feed a same SW2 switch (of order (QI$_p$):1); QO$_p$ homologue output ports of the QI$_q$ switches SW1 feed in total QO$_p$ SW2 switches whose outputs are connected to homologue input ports of QO$_p$ signal combiners SC associated to output ports belonging to OEC$_p$.

This ensures that each input port is associated to at most one output port for each output equivalence class OEC, and that each output port is associated to at most one input port for each input equivalence class IEC.

Equivalently, each input port of each inputs equivalence class IEC$_q$ is associated to at most one output port of each equivalence class of outputs OEC$_p$; this means that the decomposition of the transfer matrix in $N_{OEC} \cdot N_{IEC}$ sub-matrices SM-OEC$_p$-IEC$_q$ of size (QO$_p$×QI$_q$) is such that each sub-matrix has at most a non-null entry for each row and column. FIG. 12 exemplifies this matrix decomposition (in the example $N_I$=8, $N_{IEC}$=2, QI$_q$=$N_I$/$N_{IEC}$=4, $N_O$=12, $N_{OEC}$=3, QO$_p$=$N_O$/$N_{OEC}$=4)

Like in the WIN of FIG. 4, a signal injected into input port IP'$_1$ is divided in $N_{OEC}$ sub-signals. Each of said sub-signals is appropriately weighted by a corresponding weighting elements WE, and then it enters switch SW1 in order to be selectively directed to an output port chosen among a set of output ports belonging to a same output equivalence class OEC. But this time, like in the WIN of FIG. 7, a switch belonging to the second layer SW2 is interposed between homologue outputs of the switches SW1 and the corresponding output port OP'; depending to the configuration of said switches SW1 and SW2, the first sub-signal of the first input signal IP'$_1$ may or not find its way to the output port OP'$_1$. Together, the switches of the first and second layer ensures that for each input equivalence class IEC one and only one input port is connected at any time to a given output port and, conversely, that a given input port is connected at any time to one and only one output port belonging to a same output equivalence class OEC.

Reconfiguration of the BFN can be obtained by driving the switches in an appropriate way. It can be understood that, in order to ensure proper operation of the WIN, switches of the first and second layer cannot be operated independently from each other. Indeed, it can be shown that a switch bloc SWB constituted by QI$_q$ switches of order 1:QO$_p$ of the first layer SW1 and the associated QO$_p$ switches of order QI$_q$:1 of the second layer SW2 (FIG. 10 refers to the case QI$_q$=$N_I$/$N_{IEC}$; QO$_p$=$N_O$/$N_{OEC}$) act exactly like a interconnection network for selectively connecting QI$_q$ input ports to QO$_p$ output ports such that none of said QO$_p$ output ports is connected to more than one of said QI$_q$ input channels at any time and vice versa; said network realizes at most min(QI$_q$, QO$_p$) interconnections, QI$_q$ and QO$_p$ being positive integers each greater than one.

Interconnection networks are used for many different applications (such as telephone switches, processor/memory interconnects for parallel computers and supercomputers, wireless networks, etc.) and have been the subject of extensive research; refer for example to the work of G. Broomell and J. R. Heath: Classification Categories and Historical Development of Circuit Switching Topologies, appeared in ACM Computing Surveys (CSUR), Vol. 15 N. 2, p. 95-133, of June 1983

The networks of interest for the WIN implementation are those classified as (N,M,C) non-blocking connectors, where: N is the number of inputs, M is the number of outputs and C must be less than or equal to the smaller of N and M. It is worth noting that in graph theory terminology, a (N,M,C) non-blocking connector can realize all the possible matching with C edges of a bipartite graph with N left-hand nodes and M right-hand nodes. In particular we are interested to the cases: C=N≦M (also known as (N,M)-distributor), and C=M≦N (also known as (N,M)-concentrator); with N=QI$_q$, M=QO$_p$.

Depending on the technique used set up connections, non-blocking networks can be of three different types:

Strict-sense non-blocking SNB, if the network can always connect each idle input to an arbitrary idle output independently of the already established set of input and output connections and of the policy of connection allocation.

Wide-sense non-blocking WNB, if the network can always connect each idle input to an arbitrary idle output through a proper connection allocation policy.

Rearrangeable non-blocking RNB, if the network can always connect each idle input to an arbitrary idle output by applying, if necessary, a rearrangement of the already established input and output connections.

All these three categories of non-blocking interconnection networks fulfil the needs of a switch bloc SWB of the WIN and the selection can be based on criteria of minimization of the complexity of the network and/or of the control circuitry needed to implement the routing algorithm. The number of crosspoints in the network can be adopted as an index of complexity of the network; it is intuitive and widely recognized that the number of crosspoints increase in the following order: RNB, WNB and SNB.

Figure 14:
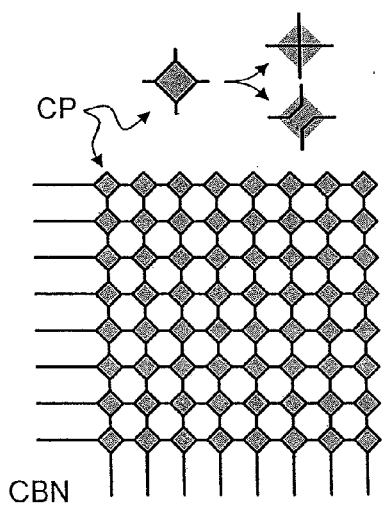
FIG. 14, a crossbar network to implement the switching bloc SWB of FIG. 13

A crossbar network CBN belongs to the category of strict-sense non-blocking SNB networks and realize the functionality of a (N,M, min(N,M)) non-blocking connector at a cost of a number of crosspoints that is proportional to the product N·M. FIG. 14 shows a CBN.

Several multiple-stage (or multistage) interconnection networks (MINs) have been proposed to realize non-blocking networks with a complexity reduction, furthermore multistage interconnection networks MIN offer other advantages such as scalability and modularity (as they can be built with similar switching node building blocks). The above-cited publication by George Broomell and J. Robert Heath describes efficient implementations of said networks.

Figure 15:
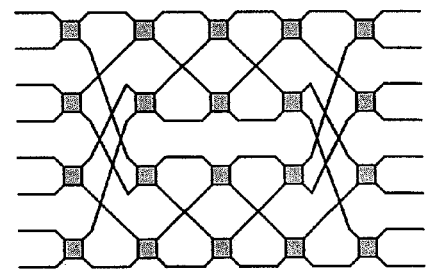
FIG. 15, a Multistage Interconnect Network to efficiently implement the switching bloc of FIG. 13

To exemplify the advantage in using a multistage interconnection network MIN to implement switch blocs SWB of the present invention, FIG. 15 shows a Benes network (rearrangeable (N,N,N) non-blocking connector) which requires $N \cdot (\log_2 N - 1/2)$ crosspoint. An extension of the Benes network to realize a (N,M, min(N,M)) non-blocking connector and a related routing algorithm is disclosed in Canadian patent CA2224601, to A. Boyarsky et alii titled, Optimal Multistage Interconnected Networks.

The BFN of FIGS. 4, 7 and 10 is particularly adapted to array-fed antennas, i.e. to composite antennas comprising a radiating array and a focusing element such as a concave reflector or a lens.

The indicated partitioning in equivalence classes can be obtained by using a mathematical theory known as "Geometry of Numbers", the relevant results of which will be summarized here below, with reference to FIGS. 16A-D.

Figure 16A:
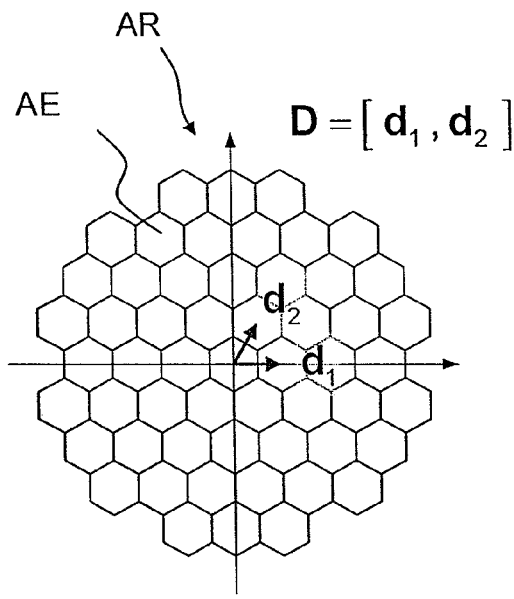
FIGS. 16A-D, graphical representations of some concept of the geometry of numbers, useful for a better understanding of the invention.

Let the planar array AR of FIG. 16A to be constituted of a set of $N_E$ radiating antenna elements AE occupying a finite set A of positions $A = \{r_i : i = 0 \ldots (N_E - 1)\}$ of an infinite lattice whose elements are defined in matrix form as $r = Dm$.

In the simple bi-dimensional case of a planar array, r and m are column vectors, respectively, with real and integer entries:

$$r = \begin{bmatrix} r_x \\ r_y \end{bmatrix}; r_x, r_y \in R \text{ and } m = \begin{bmatrix} m_x \\ m_y \end{bmatrix}; m_x, m_y \in Z$$

R and Z being the sets of real and relative numbers, respectively; while D is composed of two non-linearly-dependent real column vectors which constitute the lattice base and define the inter-element spacing, $$D = [d_1, d_2] \quad d_1 = \begin{bmatrix} d_{1x} \\ d_{1y} \end{bmatrix} \quad d_2 = \begin{bmatrix} d_{2x} \\ d_{2y} \end{bmatrix}$$

$$d_{1x}, d_{1y}, d_{2x}, d_{2y} \in R$$

and $r_i = Dm_i$ expresses the position of a radiating element of the array.

Figure 16B:
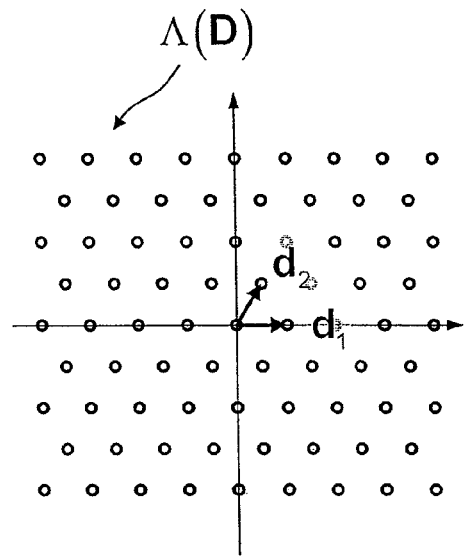
Figure 16C:
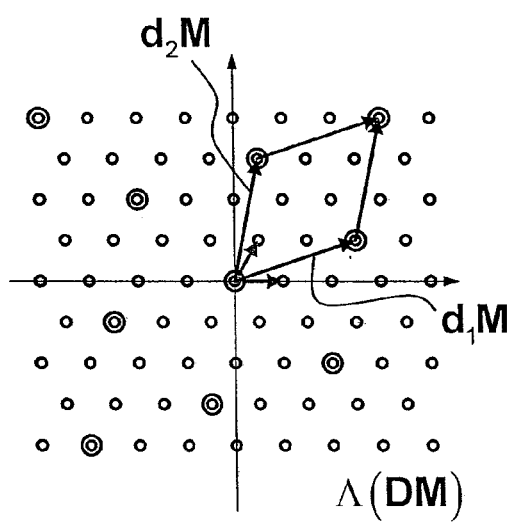

The lattice defined by D, represented on FIG. 16B, will be indicated as $\Lambda(D)$. A sub-lattice of $\Lambda(D)$ can be defined by mean of the integer matrix M and is given by $\Lambda(DM)$, see FIG. 16C. The number $|\det M|$ is called the index of $\Lambda(D)$ in $\Lambda(DM)$.

For interconnection purposes, it is enough to focus the attention on the partitioning rule that a sub-lattice induces on a lattice. The discussion can be limited, without loss of generality, to the lattice $\Lambda(I) = Z^n$ (Z being the set of relative numbers), being $\Lambda(D) = D\Lambda(I)$ for non-singular D, where I is the identity matrix of dimension n, equal to the dimension of the Euclidean space of the array $R^n$ – R being the set of real numbers (i.e. n=2 for a planar array).

Given M, it is possible to introduce the vector "modulo M" operation. Two vectors p and q in the lattice $\Lambda(I)$ are said to be congruent modulo M if their difference (q−p) belongs to $\Lambda(M)$. The modulo M operation is an equivalence relation (i.e. it satisfies reflexive, symmetric and transitive properties) and can be used to induce on $\Lambda(I)$ a set of equivalence classes (also known as "congruency classes" or "cosets") in number equal to $|\det M|$. For each $p \in \Lambda(I)$, the equivalency class $[p]$, containing p, is defined as the set of those elements which are equivalent to p modulo M:

$$[p] = \{q \in \Lambda(I) : q = p \bmod M\} =$$
$$= \{q \in \Lambda(I) : (q - p) \in \Lambda(M)\}$$

Each equivalence class is a shifted version of $\Lambda(M)$. Any two equivalence classes defined with the modulo M operation are either equal or disjoint, consequently the set of all equivalence classes of $\Lambda(I)$ forms a partition of $\Lambda(I)$: every element of $\Lambda(I)$ belongs to one and only one equivalence class. The set of all possible equivalence classes of $\Lambda(I)$ modulo M is the quotient set $\Lambda(I)/\bmod M$ (often also indicated as $\Lambda(I)/\Lambda(M)$ or briefly I/M).

A set of "Equivalence Class Representatives", ECR($\Lambda(I)/\bmod M$), is a finite subset of $\Lambda(I)$ which contains exactly one element from each equivalence class. The equivalence class representative is, in general, not unique. Exploiting the fact that p certainly belongs to the equivalence class $[p]$, it is possible to abuse the notation and write the set of equivalence class representatives for the quotient set and vice versa.

Tacking $|\det M|$ elements of the $\Lambda(I)$ lattice, each from a different equivalence class modulo M, it is possible to obtain an elementary cell C(I/M) which has the interesting property of constituting a building block that repeated with the periodicity defined by the matrix M covers the full infinite lattice I. It can be shown that C(I/M)=ECR($\Lambda(I)/\bmod M$).

Being not unique, this construction leaves a high degree of freedom in selecting the elementary cell, and some further criteria may result more efficient in some senses.

A criterion particularly well suited in application to a focused array would be the selection of the $|\det M|$ elements in accordance to their belonging to FVR(M), the "Fundamental Voronoi Region" defined by $\Lambda(M)$. The Fundamental Voronoi Region of the lattice $\Lambda(M)$:FVR(M) is defined as the convex set of all points that are closest to the zero lattice vector (i.e. the coordinate center) than to any other lattice point of $\Lambda(M)$:

$$FVR(M)=\{r \in R^n : \|r\| \le \|r-p\| \text{ for } p \in \Lambda(M); p \ne 0\}$$

Figure 16D:
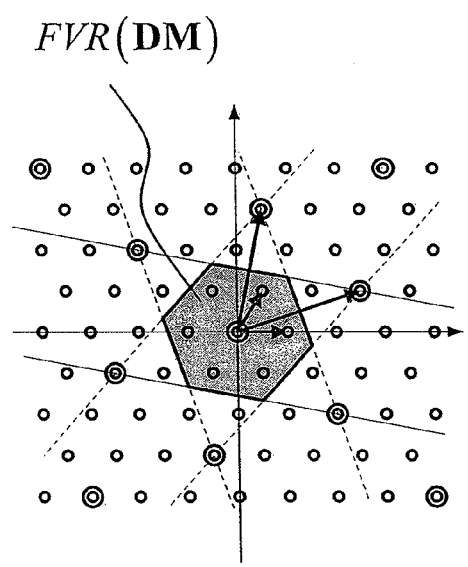

The concept of fundamental Voronoi region is illustrated on FIG. 16D.

This criterion guarantees the contiguity of the elementary cell elements (being the Voronoi region a convex set) and the minimum spreading of the peripheral elements in terms of standard deviation with respect to the elementary cell centroid. In summary this choice corresponds to selecting a set of Equivalence Class Representatives ECR included in the Fundamental Voronoi Region FVR:

$$C(I/M)=ECR(\Lambda(I)/modM) \subseteq FVR(M)$$

In case the sublattice $\Lambda(M)$ is "clean", in the sense that the boundary of the Fundamental Voronoi Region of the lattice $\Lambda(M)$, FVR(M), does not intersect $\Lambda(I)$, then the choice corresponds to:

$$C(I/M)=\Lambda(I) \cap FVR(M)$$

Another possible criterion would be the selection of the |det M| elements in accordance to their belonging to the Fundamental Parallelepiped, FPD(M), which is defined as the set of all points in $R^n$ within the region enclosed by the sub-lattice basis vectors and can be expressed as:

$$FPD(M)=\{r \in R^n : r=Ms \text{ for } s \in [0,1)^n\}$$

In this case the elementary cell corresponds to the choice:

$$C(I/M)=\Lambda(I) \cap FPD(M)$$

These mathematical properties can be used in a constructive mode. A proposed decomposition procedure for a focused array consists in the following steps:

A1 The array is defined on the base of the radiation requirements and is composed of a finite set A of $N_E$ radiating elements occupying the positions $A=\{r_i : i=0 \ldots (N_E-1)\}$ A2 The array geometrical configuration defines the matrix D of the elements positions lattice $(A \subset \Lambda(D)=D\Lambda(I))$.

A3 A number of elements per beam $(N_{EpB})$ is defined starting from considerations on the antenna optical configuration and radiation requirements. $N_{EpB}$ has to be considered as the number of elements that will participate to the formation of a beam.

A4 An integer matrix P is synthesized such that $|\det P|=P \ge N_{EpB}$ and the elements constituting the elementary cell $C_{DP}=C(D/DP)$ (e.g. corresponding to the Voronoi region of $\Lambda(DP)$) are satisfactory in terms of radiating performances (e.g. size, shape, orientation, etc.), taking into account the fact that, as it will be discussed later, each beam of the array antenna is generated by radiating elements belonging to a same elementary cell.

A5 The elements of the finite planar array $A \subset \Lambda(D)$ are partitioned in P equivalence classes $[r_p]$ defined by the residues modulo P operation:

$$[r_p]=\{r \in A \subset \Lambda(D): r=r_p \bmod P; r_p \in C_{DP}\} \, p=1 \ldots P$$

A6 Numbering of the elements is performed defining two indexes (p, q) identifying, respectively, the equivalence class $[r_p]$ and the assigned position of the element within the class.

Figure 17A:
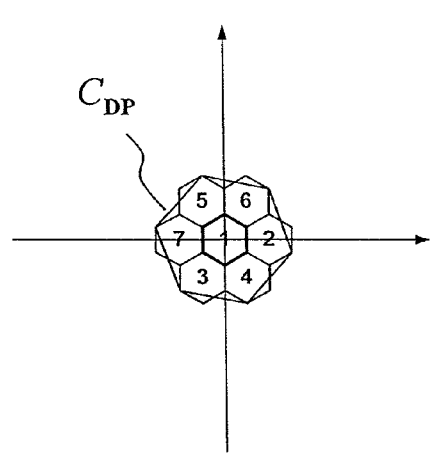
FIGS. 17A-D, the indexing of antenna elements constituting an array, partitioned into equivalence classes according to the invention.
Figure 17B:
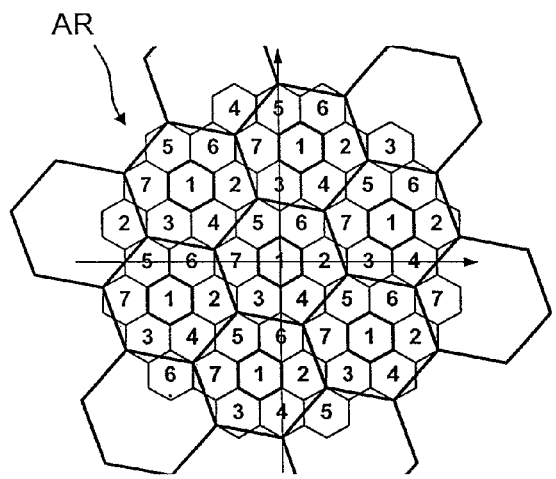
Figure 17C:
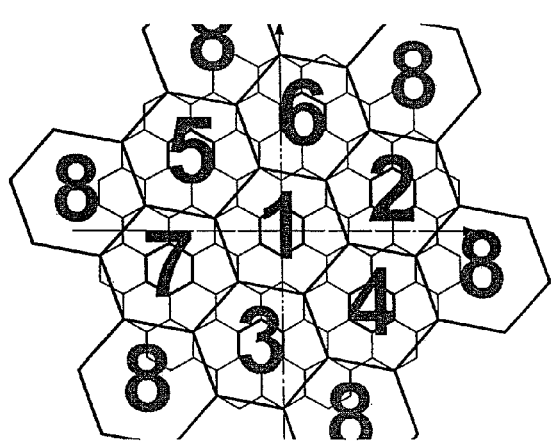
Figure 17D:
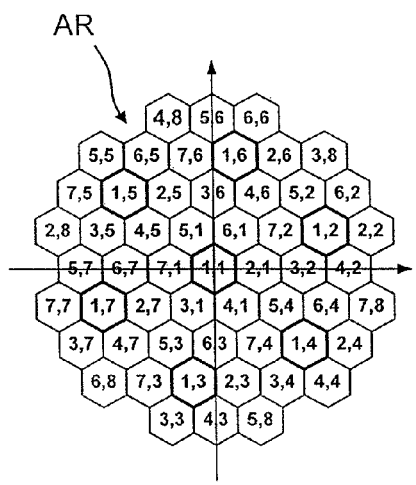

Step A6 is illustrated on FIGS. 17A-D. More precisely, FIG. 17A illustrates the numbering of antenna elements of the array AR of FIG. 16A belonging to a fundamental Voronoi region FVR. The elementary cell FVR, of hexagonal shape in this example, comprises seven elements which are numbered from 1 to 7, and belong to seven respective antenna equivalence classes AEC. FIG. 17B shows that the whole array AR can be constructed by replicating the fundamental Voronoi region FVR. The elements of an array constructed this way are automatically partitioned into seven equivalence classes. As shown on FIG. 17C, each elementary cell constituting the array is numbered; as a consequence—and as discussed above—the position of a generic element of the array is completely defined by a pair of indexes, the first of which identifies the antenna equivalence class AEC and the second of which identifies the position of the element within the sub-array corresponding to said class. This is illustrated on FIG. 17D.

Figure 18A:
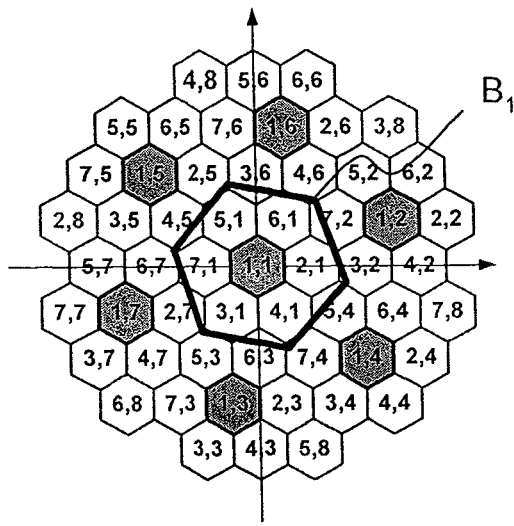
FIGS. 18A-C, the generation of different beams by groups of contiguous antenna elements comprising one and only one element per equivalence class.
Figure 18B:
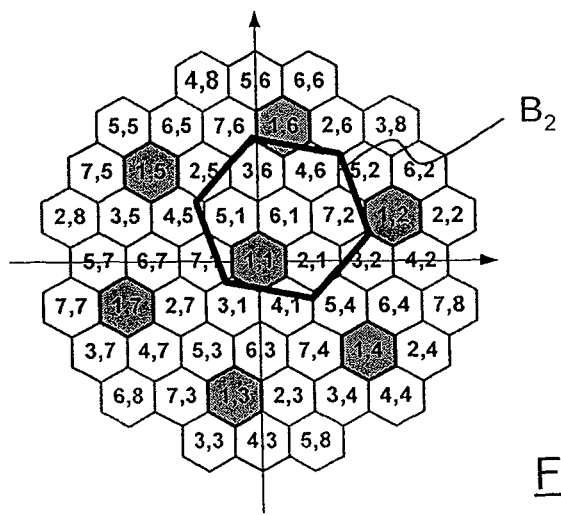
Figure 18C:
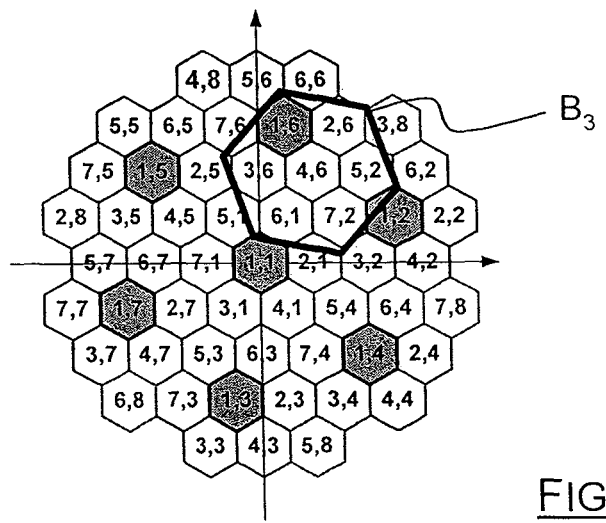

By construction, a beam formed by $N_{EpB} \le P$ contiguous radiating elements needs to access only one element per antenna equivalence class. This is illustrated on FIGS. 18A-C, where contours $B_1$-$B_3$ highlight radiating elements contributing to the generation of three different beams; the antenna element class $AEC_1$, formed by all the elements with first index equal to 1, (1,x), is highlighted in gray; only one element of $AEC_1$ is necessary generate a beam $B_1$-$B_3$. It will be noted that a radiating element (e.g. elements 1,1 or 6,1) can contribute to the generation of several beams.

Antenna equivalence classes identify non-intersecting subsets whose direct sum returns the initial full set of antenna ports of the BFN. The partitioning of the nodes relevant to the antenna ports (right-hand nodes in a transmit BFN, left-hand nodes in a receive BFN) in equivalence classes (i.e. OEC in transmit and IEC in receive) is thus satisfied by the equivalence classes induced by a sublattice $\Lambda(DP)$ on a lattice $\Lambda(D)$. The partition of the antenna elements AE with steps A1-A6 allows to identify equivalence classes of antenna ports as required to implement the weight and interconnect WIN of FIG. 4 (AEC identify OEC in a transmit BFN), of FIG. 7 (AEC identify IEC in a receive BFN) and of FIG. 10 (AEC identify one set of port equivalence classes, OEC in transmit and IEC in receive; opposite side equivalence classes must be identified accordingly to some other criteria, as will be described below).

Before entering in the details of the resulting bipartite graph, it is preferable to add some comment to the described procedure and further expand indexing alternatives.

The focus of the step A4 is on the synthesis of the integer matrix P and the selection criteria can be extended to the suitability of different realizations of $ECR(\Lambda A(D)/modDP)$ to satisfy the desired reconfigurability conditions of the radiation pattern.

Step A6 of the described procedure is purposely generic to allow handling a broad set of configurations that may arise in practice. In its general unstructured statement, each equivalence class $[r_p]$ may have a different number of elements $Q_p=\dim[r_p]$ with the q indexing substantially based on look-up tables:

$$r_{p,q} \in [r_p]$$
$$p=1 \ldots P$$
$$q=1 \ldots Q_p$$

$Q_p$ is the number of element of the equivalence class $[r_p]$, $Q_p=\dim[r_p]$, such that, $$\sum_{p=1}^{P} Q_p = N_E$$

Some indexing simplification can be obtained either if all the equivalence classes have the same dimension Q (with $PQ=N_E$) or if a single dimension Q $$\left(Q = \max_p Q_p = \max_p(dim[r_p])\right)$$

and $PQ \leq N_E$) is retained for the q index.

The second option could be interpreted as an introduction of fictitious elements that would render iso-dimensional all the equivalence classes.

In the design phase of the array, or in its a posteriori partitioning, more structured strategies could be applied to the assignment of the q index. The following optional steps constitute a refinement of step A6:

A6a A second integer matrix Q is synthesized such that:

$$|detQ| = Q = \max_p Q_p = \max_p(dim[r_p]),$$

$|detPQ|=|detP||detQ|=PQ \geq N_E$ and an elementary cell $C_{DPQ}=C(D/DPQ)$ (to be broadly intended as the set of equivalence class representatives) can be defined to include all the elements constituting radiating array $A \subseteq C_{DPQ}$.

Matrix Q defines a lattice $\Lambda(Q)$, sub-lattice of $\Lambda(I)=Z^n$, with elementary cell $C(I/Q)$. Any element r of the elementary cell $C_{DPQ}$ (and in turn of the array being $A \subseteq C_{DPQ}$) can be univocally expressed as:

$r_{p,q}=((DPq+r_p)mod DPQ)$ $r_{p,q} \in C(D/DPQ)$
$r_p \in C(D/DP)$
$q \in C(I/Q)$ where an indexing q of $q \in C(I/Q)$ is assumed.

The notation can be made more uniform by introducing the integer vectors $p=D^{-1}r_p$ with $p \in C_P = C(I/P) = D^{-1}C(D/DP)$:

$r_{p,q}=D((Pq+p)mod PQ)$ $r_{p,q} \in C(D/DPQ)$
$p \in C(I/P)$
$q \in C(I/Q)$

Again, the numbering of the elements is performed defining the two indexes (p, q) identifying, respectively, the equivalence class and the assigned position of the element within the class. The advantage brought by the application of step A6a stands on the fact that to perform the q numbering only the Q elements of elementary cell $C(I/Q)$ must be ordered. The assignment of the q index to the elements of each equivalence class $[r_p]$ is made automatically with the $D((Pq+p) \mod PQ)$ operation.

The reciprocal independence of the p,q indexing allows obtaining $C(D/DPQ)=D\ C(I/PQ)$ as a cartesian product of the two sets $C(D/DP)=D\ C(I/P)$ and $C(I/Q)$. Notably, this property will be useful for a row-column arrangement of the BFN architectures The description above is based on a mono dimensional representation for each of the indexes p,q. Bi-dimensional indexing of the equivalence classes relative to an integer matrix $M=[m_1,m_2]$ has been described in A. Guessoum and R. M. Mersereau, "Fast algorithms for the multidimensional discrete Fourier transform" IEEE Transactions on Acoustics, Speech, and Signal Processing, Vol. 34, No 4, pp 937-943, August 1986. For a bidimensional lattice it is based on the definition of two integer vectors $x_1$, $x_2$ and three integers $g_{11}$, $g_{21}$, $g_{22}$ such that:

$m_1=g_{11}x_1$ $m_2=g_{21}x_1+g_{22}x_2$

Under this assumptions the set of vectors $m_1x_1+m_2x_2$ width $m_1=0, 1, \ldots, (g_{11}-1)$
$m_2=0, 1, \ldots, (g_{22}-1)$ constitutes a representative system for the $g_{11}g_{22}=|det\ M|=M$ vectors of $C(I/M)$. Being two indexes needed, the process is called a "rectangularization" process.

The described step A6a is particularly effective if the matrix Q is such to satisfy the perfect covering condition $A=C(D/DPQ)$ so that $|det\ Q|=N_E/P$. Further efficiency can be added by writing $C(D/DPQ)$ as the direct sum of the two spaces $D\ C(I/P)$ and $C(I/Q)$, thus avoiding the vector modulo operation $C(D/DPQ)=D(PC(I/Q)+C(I/P))$ Under this hypothesis:

$r_{p,q}=D(Pq+p)$ $r \in C(D/DPQ)$
$p \in C(I/P)$
$q \in C(I/Q)$

In some cases, if the array geometry is particularly irregular, the covering condition imposed on $C(D/DPQ)$ to be an elementary cell may result in an Q matrix with $|det\ Q|=Q$ exceeding $N_E/P$, requiring the introduction of fictitious elements.

These drawbacks are avoided by introducing an alternative step A6b:

A6b The elementary cell $C_{DP}=C(D/DP)$ is used to tessellate the set of elements constituting the planar array A with a number of completely occupied cells $$Q_1 \leq \min_p(dim[r_p]).$$

For these cells, a set of integer vectors $C_{Q1}$ is identified such that $$r_{p,q} = D(Pq + p) \in A \quad \begin{array}{l} p \in C(I/P) \\ q \in C_{Q_1} \\ q = 0 \ldots (Q_1 - 1) \end{array}$$

$p \in C(I/P)$
$q \in C_{Q1}$
$q=0 \ldots (Q_1-1)$

For each equivalence class $[r_p]$ this correspond to a Cartesian indexing of $Q_1$ elements, the unaddressed elements of the class are individually indexed (e.g. by means of look up tables) with $$Q_2 = \max_p(dim[r_p]) - Q_1$$

remaining q indexes.

Step A6b is also applicable to the case the array A can be fully covered by mean of tessellation with the $C(D/DP)$ elementary cells (i.e.: $Q_2=0$). This situation can happen if the application of step A6a generates fictitious elements themselves arranged in a set of complete elementary cells $C_{DP}=C(D/DP)$.

The above-described partitioning, in all its different applicable indexing forms, has the property of decomposing the antenna ports in a set of equivalence classes and the full bipartite graph of a weight and interconnect network WIN representing a Beam-Forming Network for such antenna array in a set of non-colliding bipartite graphs in number equal to the number of antenna equivalence classes.

It is recalled that, from a geometrical point of view, antenna elements connected to antenna ports belonging to a same equivalence class are not adjacent, but form a sub-lattice of the antenna array, and groups of $N_{EpB}$ adjacent elements belonging to different equivalence classes form elementary cells tessellating said array. By driving the switches (e.g. SW1 in the WIN of FIG. 4 for a transmit array) in an appropriate way, it is possible to select the group of adjacent elements to which the first beam signal is associated, thus providing the system with reconfigurability.

To achieve the full non-colliding property it is necessary to partition also the nodes of the graphs corresponding to beam ports of the BFN in beam equivalence classes BEC such that beams belonging to the same class do not share any element to formation a beam. BEC identify IEC in the transmit BFN of FIG. 4; BEC identify OEC in the receive BFN of FIG. 7. In the BFN of FIG. 10, BEC identify one set of port equivalence classes (IEC in transmit and OEC in receive); each non-colliding bipartite graph of the WIN is constructed with the beam nodes of a certain beam class and with the element nodes of a certain other element class. The result is that for each element of the cartesian product of the set of beam classes times the set of element classes a non-colliding bipartite graph exists and must be included in the BFN topology.

Application of the geometry of numbers allows constructing in a systematic way said beam equivalence classes BEC, based on the principle of vector modulo congruency. The number of beam equivalence classes is larger than or equal to $N_{BpE}$, which is the maximum number of different beams sharing a single radiating element (Number of Beams-per-Element).

Figure 19:
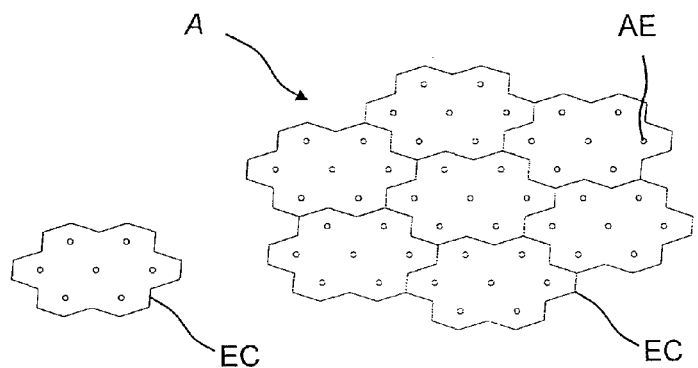
FIG. 19, the decomposition of a planar array of antenna elements in elementary cells.
Figure 20A:
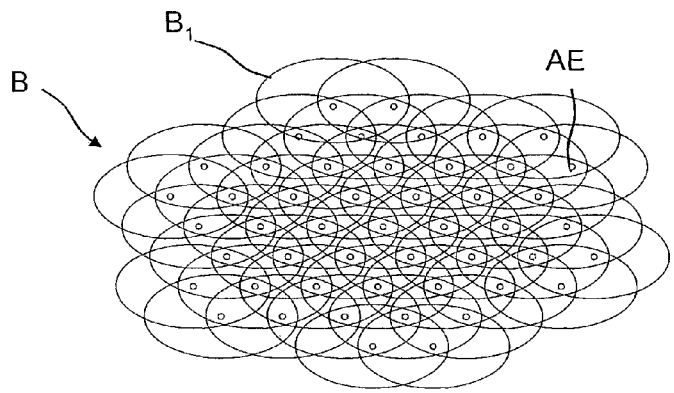
FIGS. 20A and 20B, the decomposition of a set of beams in equivalence classes of non-overlapping beams.
Figure 20B:
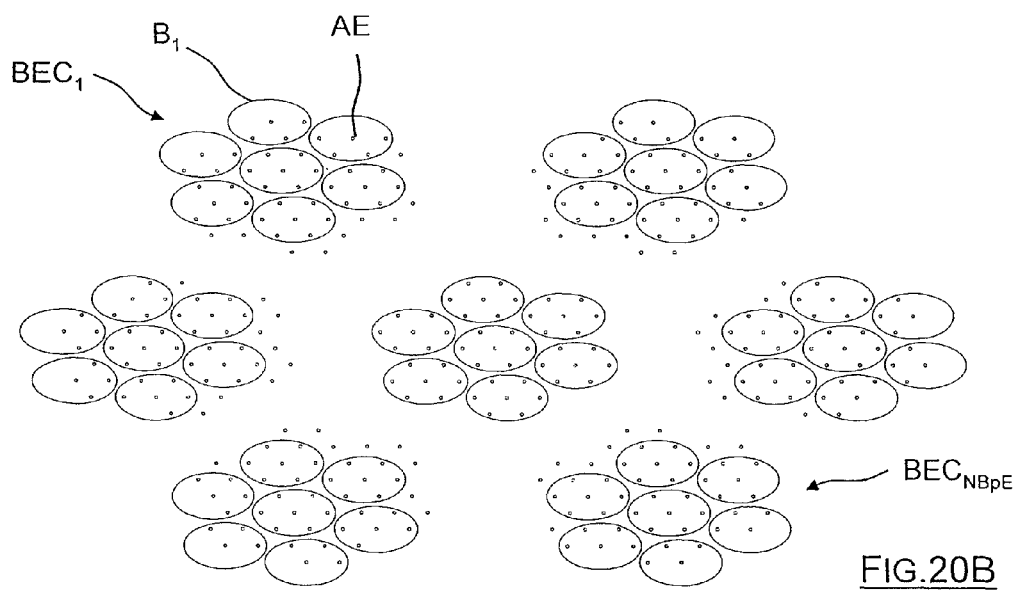

The principle of construction of beams equivalence classes is exemplified starting from the 49-element planar array A shown on FIG. 19. This array has been constructed based on an elementary cell EC comprising 7 elements AE. It is hypothesized that a beam can be generated by up to 7 elements. Any element of the array can be considered as a potential beam centre (further granularity of the beam position is achievable by amplitude/phase tapering of the excitations within a 7 feeds cluster) and the total set of possible beams B (each represented by a circle centered on an antenna element and comprising up to 7 elements) is shown in FIG. 20A. The partitioning of the beams in 7 equivalence classes of 7 beams showing non-overlapping excitations is reported in FIG. 20B.

All the elements belonging to the same equivalence class belong to different beams, and no beam belonging to a beam equivalence class shares an element with any other beam of the same equivalence class.

Applying both antenna elements and beams partitioning we can use the WIN of FIG. 10. In a transmit BFN configuration input ports correspond to beams and output ports to antenna elements, with $N_{IEC}=N_{BpE}$ and $N_{OEC}=N_{EpB}$. At a first sight, it could seem that the complexity of the BFN increases, instead of decreasing, passing from the configuration of FIG. 1 to those of FIGS. 4, 7 and finally FIG. 10. In fact, the gain in complexity is provided by the fact that the number of "expensive" weighting elements is reduced, even if less costly devices such as switches or non-blocking matrices are introduced. A detailed analysis shows that the overall complexity reduction can be very significant, i.e. of one order of magnitude or even more. The savings are particularly noticeable in a digital implementation, considering that also the number of required adders (implementing signal combiners) is reduced accordingly by a factor of $N_E/N_{IEC}$.

Let us consider a BFN intended for driving a 127-element array antenna, in an array-fed architecture, in order to generate 79 independent beams: such a system is suitable e.g. for Europe coverage. By assuming a digital implementation where a complex multiplier (used for performing weighting) requires about 6000 gates, a complex adder (used for signal concentration) requires 300 gates and a switch requires 100 gates, a fully interconnected BFN (FIG. 1) would necessitate about 60 millions gates. Partitioning the antenna elements in 7 equivalence classes (i.e. using the architecture of FIG. 4 for a transmit BFN with $N_{EpB}=7$) brings the number of gates down to less than 8 millions. Applying also a beam partitioning in 7 equivalence classes (i.e. using the architecture of FIG. 10 with $N_{EpB}=7$ and $N_{BpE}=7$) further simplifies the BFN and brings the number of gates below 5 millions. These figures obviously depend on and scale (non-linearly) with the word lengths used to represent the digital signals and the weights coefficients.

An additional advantage of the proposed architecture of FIG. 10 is that it is functionally fully symmetrical and the logical flow direction can be reversed without any effect. In particular the BFN architecture has been described considering its operation in transmission with a left to right signal flow and with the left and right ports corresponding respectively to the beam and to the radiating elements (they can also be beamlets or other BFN stages). In a microwave implementation with reciprocal devices the flow may be reversed for operating the BFN in reception without changing beam and element port interconnections. The intrinsic symmetry of the BFN allows also to reuse the same BFN (with appropriate selection of the number of equivalence classes) interchanging the beam with the element ports (for receive operation) while maintaining the left to right signal flow direction (fundamental for a digital implementation). To be exact, the BFN architecture is perfectly symmetric only when $N_B/N_{BpE}=N_E/N_{EpB}$. If required, however, a suitable number of fictitious beam ports and/or element ports can always be introduced in order to fulfil this condition.

The BFNs of FIGS. 4, 7 and 10 offer full steering capability for "pencil"-like beams in a focused array antenna configuration. However, their beam-shaping capabilities are quite limited, due to reduced number of elements contributing to the formation of each beam ($N_{EpB}<<N_E$). This limitation of the proposed architecture can be overcome by providing a set of low-complexity networks, hereafter indicated as "copy-tree networks" CTN (for transmission) or "add-tree networks" ATN (for reception) connected to the ports of the BFN.

An input copy-tree-network for transmission application is reported in FIG. 21A. Such a network is only composed by transmission lines and switches. It can be easily understood that, by operating the switches, a signal injected into the network at a left-hand port can be transmitted to zero, one or more than one right-hand ports.

In the configuration of FIG. 21A, each input (left-hand) port is connected to one respective output (right-hand) port: the copy-tree network is "transparent". This appears more clearly on FIG. 21B, where different signals are associated to different levels of gray.

FIG. 21C shows, again with the help of a scale of gray, a different configuration, where input signals are only injected into the first, fifth, seventh and eight left-hand ports. The input signal injected into the first left-hand port is transmitted to the first to fourth right-hand ports; the signal injected into the fifth left-hand port is transmitted to the fifth and sixth right-hand port; the signals injected into the seventh and eighth left-hand ports are only transmitted to the seventh and eighth right-hand ports, respectively.

In the configuration of FIG. 21D the input signal injected into the first left-hand port is transmitted to the first to sixth right-hand ports; and the signal injected into the seventh left-hand port is transmitted to the seventh and eighth right-hand ports.

Finally, in the configuration of FIG. 21E, the input signal injected into the first left-hand port is transmitted to all the eight right-hand ports.

Application of copy-tree networks to BFN according to the invention is based on the consideration that, in order to increase the number radiating elements contributing to a single beam (therefore increasing the beam-shaping capabilities for said beam), multiple beam input ports (in a transmission BFN) could be excited with the same signal. And, as illustrated above, this can be easily obtained with the help of "copy-tree networks".

Of course, the drawback of this solution is that the overall number of beams which can be generated at a same time is decreased.

Not to incur in a colliding situation (i.e. the same beam distributed several times to the same radiating element) the beam input ports must be chosen to belong to different beam equivalence classes. Therefore, a different copy-tree network CTN is provided for each beam port equivalence class, as illustrated on FIG. 22.

Figure 22:
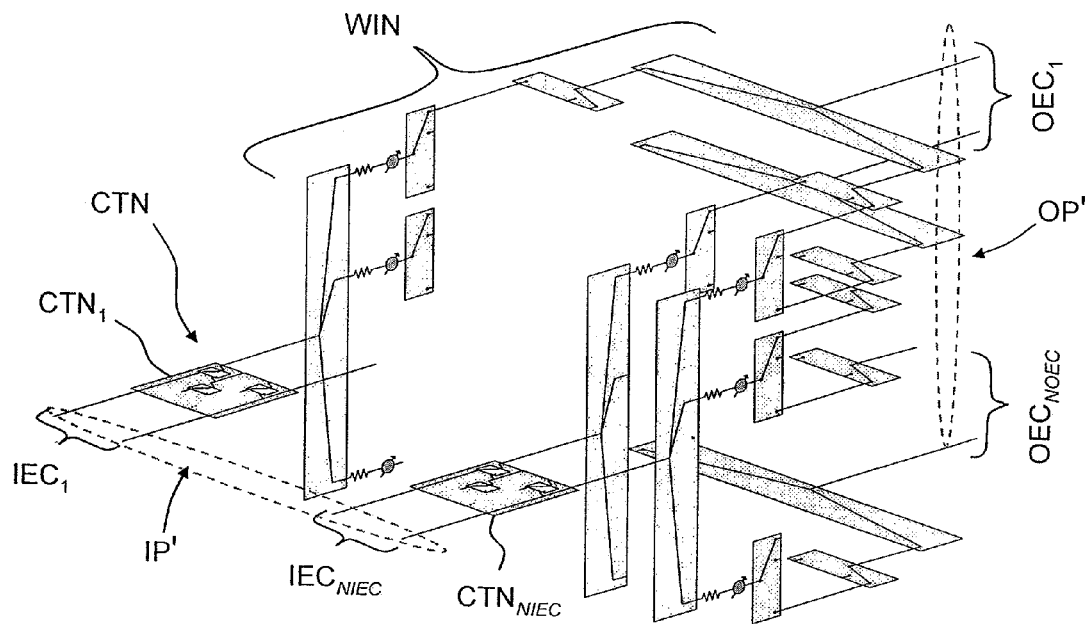
FIG. 22, the topology of a reconfigurable BFN according to said forth embodiment of the invention.

The architecture of FIG. 22 allows flexibility in changing the number of feeds-per-beams from the extremes of $N_B$ beams with $N_{EpB}$ radiating elements each (like in the case of FIG. 10), to $N_{BpE}$ beams each with full access to $N_E$ radiating elements, in steps equal to multiple of $N_{EpB}$.

Figure 23:
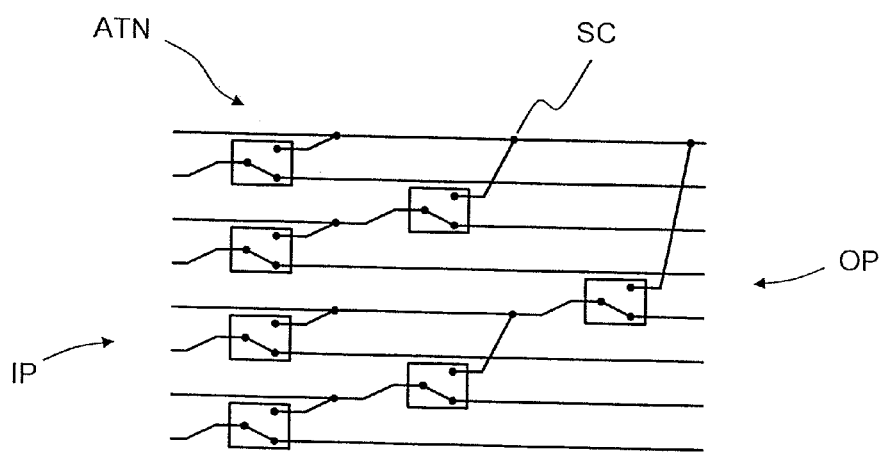
FIG. 23, a concasting switching network (ATN) used in a reconfigurable BFN according to a fifth embodiment of the invention.

Of course, the BFN of FIG. 22 loses its symmetry due to the introduction of copy-tree networks CTN. However, symmetry can be restored by providing add-tree networks at the antenna side (an "add-tree network" is exactly the same thing as a "copy-tree network", but with reversed inputs and outputs, as shown in FIG. 23).

The BFN topology of the invention can be extended to the case of the so-called "multimatrix" concept, which was initially proposed to tackle the difficulty of moving power from one beam to another in satellite payloads based on Array Fed Reflector antennas. This concept can be considered an extension to multi-feed-per-beam antenna configurations of the multi-port amplifier concept first proposed for satellite applications by G. R. Welti in U.S. Pat. No 3,917,998.

In multi-port amplifier amplifiers, the power sharing flexibility is achieved through the parallel amplification of all signals by a stack of Power Amplifiers. Each MPA comprises an input network (INET), a stack of High Power Amplifiers (HPA) and an output network (ONET).

Multi-port amplifiers can be directly applied to multibeam antenna systems based on single feed per beam configurations, where each beam is formed by a single feeding element. However such systems, to achieve good radiating performances (e.g. edge of coverage gain, beam-to-beam isolation, reduced spillover losses, etc.) typically require the beams to be generated by multiple apertures (each generating a sub-set of the required beams). A possible solution to generate a multibeam coverage using a single aperture is the Array Fed Reflector where the beams are formed from multiple feeding elements. To achieve the required beam overlapping, sets of overlapping feeding elements are used for adjacent beams.

The system described in K. W. Spring and H. J. Moody work titled, "Divided LLBFN-HMPA transmitted architecture", U.S. Pat. No 4,901,085, and schematically illustrated on FIG. 24, combines the capabilities of an Array Fed Reflector configuration with those of multi-port amplifiers. In such a system, the Array Fed Reflector configuration allows efficient radiative performances while the MPAs allow the power for any feed element or set of feed elements to be distributed evenly among the individual power amplifiers providing flexible assignment of traffic between beams up to the limit of the total of the amplifiers power resources.

Figure 24:
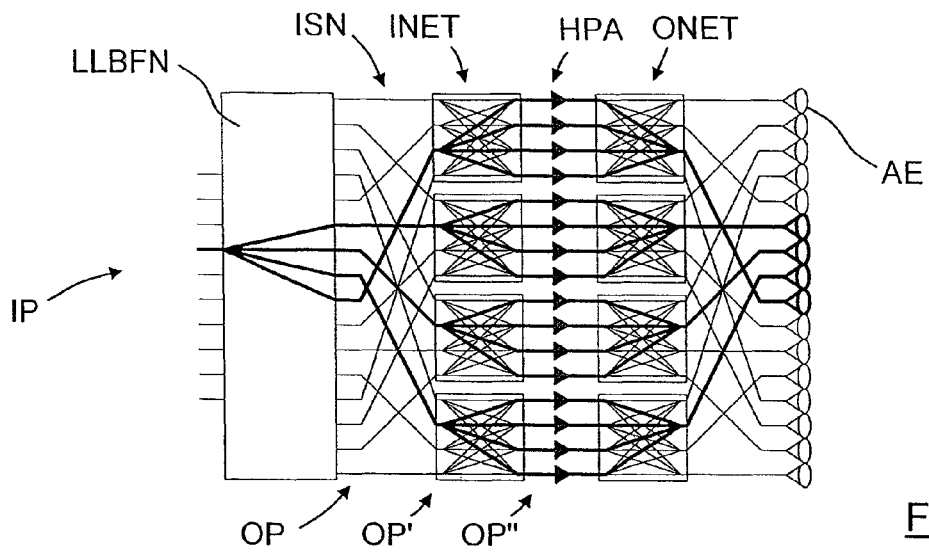
FIGS. 24 and 25, the topology of two "multi-matrix" beam-forming network according to the prior art.

As illustrated on FIG. 24, a "multimatrix" BFN according to the architecture devised by Spring and Moody comprises:

A low-level non reconfigurable BFN (LLBFN) having a set of input ports IP equal in number to the number of beams $N_B$ and a set of output ports OP equal in number to the number of radiating elements $N_E$, said LLBFN being configured to transmit an input injected into an input port to $N_E$ different output ports;

A set of N input multiport hybrid networks (e.g. Butler networks) INET having a cumulated number of input ports which is equal to (or larger than) the number of output ports of the LLBFN. It is well known that a signal injected in an input port of a hybrid network is transmitted to all the output ports thereof with a phase taper which depends on the input port.

A fixed Input Scrambling Network (ISN) connecting each output port OP of the LLBFN associated to a particular input port thereof to an input of a different hybrid network INET;

A set of High-Power Amplifiers HPA connected to respective output ports OP" of the INETs;

A set of N output multiport hybrid networks (e.g. Butler networks) ONETs symmetric (reciprocal) to the INETs;

A fixed Output Scrambling Network (OSN), symmetric with respect to the ISN, connecting each output port of the ONET to a radiating antenna element AE.

The bold lines on FIG. 24 represent the path of a beam signal injected into a multimatrix BFN according to the Spring and Moody architecture. The LLBFN divide this signal into several sub-signals which are distributed by the ISN to all the INETs. Then, the INETs further subdivide the sub-signals and inject them in all the HPAs. The ONETs reconstitute the amplified sub-signals and the OSN associate them to respective adjacent antenna elements AE. Finally, focusing means (non represented), e.g. a concave reflector, form a transmitted beam whose propagation direction depends on the position of the radiating AE within the array antenna and on the applied amplitude and phase tapering.

The topology of the multi-port amplifier stage together with an appropriate feed reuse scheme reduces the order of complexity of the hybrid output matrices while maintaining the power flexibility of a completely connected multiport amplifier. However, the hard-wired interconnections of each beam port to the INETs inputs makes the Spring and Moody BFN intrinsically non-reconfigurable.

Figure 25:
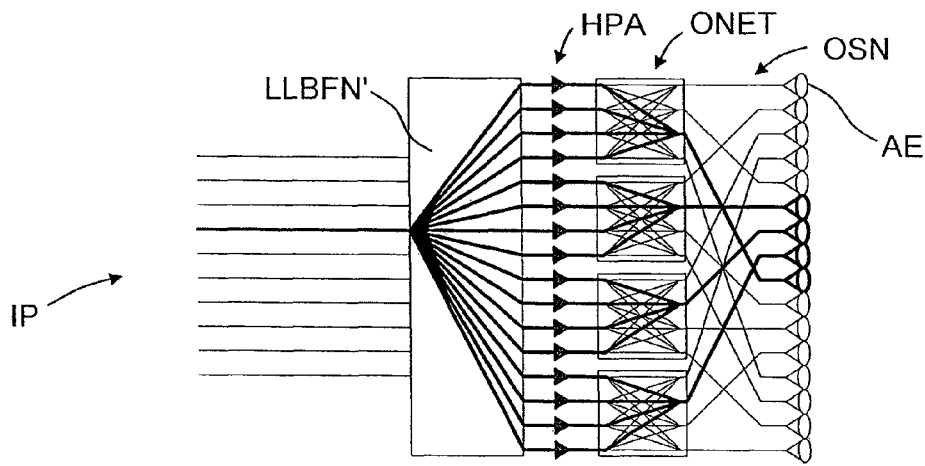

U.S. Pat. No. 5,115,248 to A. Roederer proposes an alternative multimatrix architecture, represented on FIG. 25, which has the advantage of being reconfigurable, avoids the input hybrid networks INETs and the input scrambling network ISN, but make use of an input reconfigurable low level BFN LLBFN' which is much more complex than the one by Spring and Moody, especially when the number of beams is high.

The idea at the basis of the Roederer architecture is to replace the hard-wired LLBFN and ISN of the Spring and Moody BFN by a fully interconnected reconfigurable BFN, similar to that depicted on FIG. 1, schematically represented by bloc LLBFN'.

Figure 26:
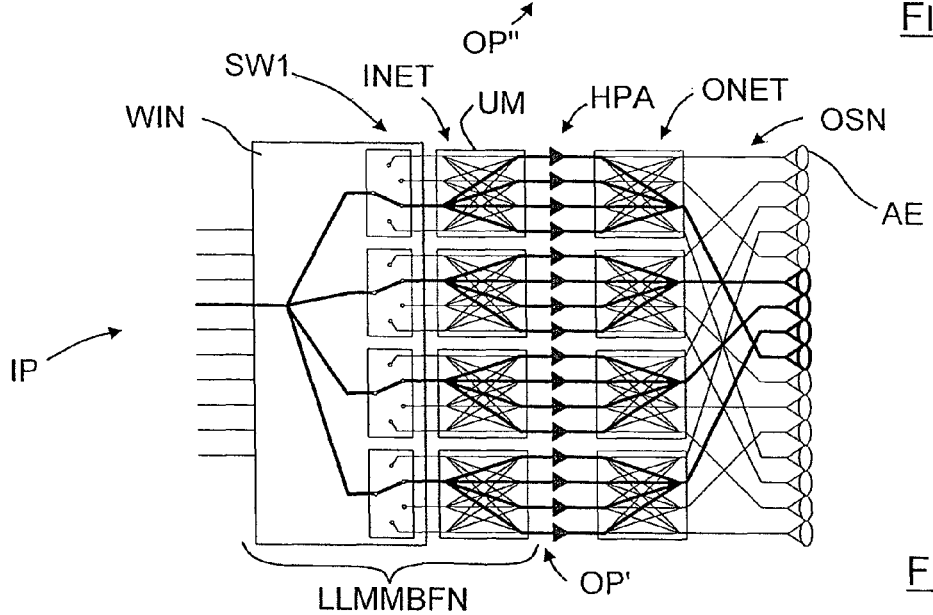
FIGS. 26 and 27, the topology of a reconfigurable BFN according to a sixth embodiment of the invention.
Figure 27:
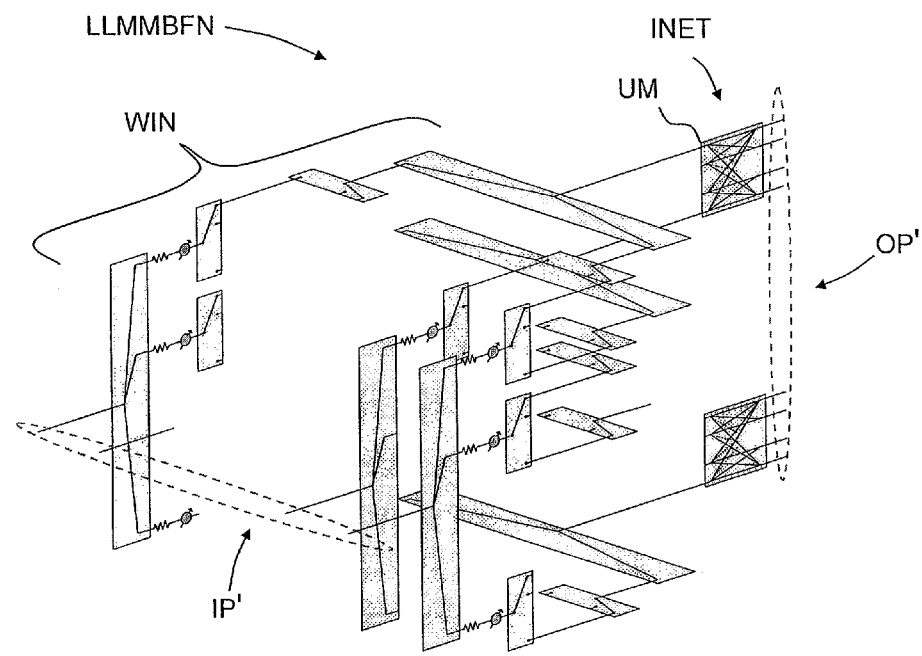

A very significant complexity reduction can be obtained, while retaining sufficient flexibility, by replacing the fully-interconnected BFN of the Roederer architecture by a "partitioned" weighting and interconnecting network WIN according to the above-described embodiments of the inventions (FIG. 4 or 10), as illustrated on FIG. 26 and detailed on FIG. 27. Otherwise stated, a low level (i.e. terminating at the input of the HPAs) multimatrix BFN (LLMMBFN) according to the invention differs from a simpler WIN array-fed reflector architecture only in that it further comprises a set INET of $N_{EpB}$ hybrid unitary matrices UM, each having $N_E/N_{EpB}$ input ports and $N_E/N_{EpB}$ output ports, the input ports of each hybrid unitary matrix being connected to the WIN output ports belonging to a respective equivalence class of output ports of the beam-forming network. Like in the prior art architectures, the output ports of the INET are connected to the antenna elements AE by a set of HPAs, a set ONET of output hybrid networks and an output scrambling network OSN (not represented on FIG. 27).

FIG. 26 represents, in a simplified way, the path of a single beam signal (bold lines) in such a multimatrix BFN. Only the first column of the first layer of switches SW1 of the WIN of FIG. 4 is shown. FIG. 26 can be easily compared with FIG. 24 to comprehend that, setting the switches in an appropriate status, the two architectures perform the same functionality but with the advantage that disclosed configuration allows reconfigurability.

It is interesting to note that "copy-tree networks" can also be provided at the input of a BFN according to FIGS. 26 and 27.

Up to now, only the case of focused architectures, either of the "array-fed" (FIGS. 4, 7 and 10) or of the "multimatrix" (FIG. 27) type, has been considered. However, the BFN of the invention can also be applied to the case of direct-radiating arrays, comprising no external focusing elements such as reflectors or lenses.

Extension of the concept of the invention to the case of direct radiating arrays (i.e. array antennas without any external focusing element such as a concave reflector) is also based on the use of unitary hybrid matrices such as Butler matrices or FFT matrices.

As it is known from the prior art, a Butler matrix is a beam forming network circuit consisting of interconnected fixed phase shifters and hybrid couplers. The matrix produces N orthogonal sets of amplitude and phase output coefficients, each corresponding to one of the N input ports. A Butler matrix performs the equivalent of a one-dimensional Discrete Fourier Transform (1D-DFT); it is, in fact, a hardware analogue of the FFT radix-2 algorithm.

FFT/Butler BFNs known from the prior art exploit a decomposition of an high order $N=P \cdot Q$ network in two layers of lower order P, Q sub-matrices; this decomposition can be iterated in a cascade of smaller FFT/Butler networks to the point that their order is prime and any further decomposition can not be done.

Figure 28:
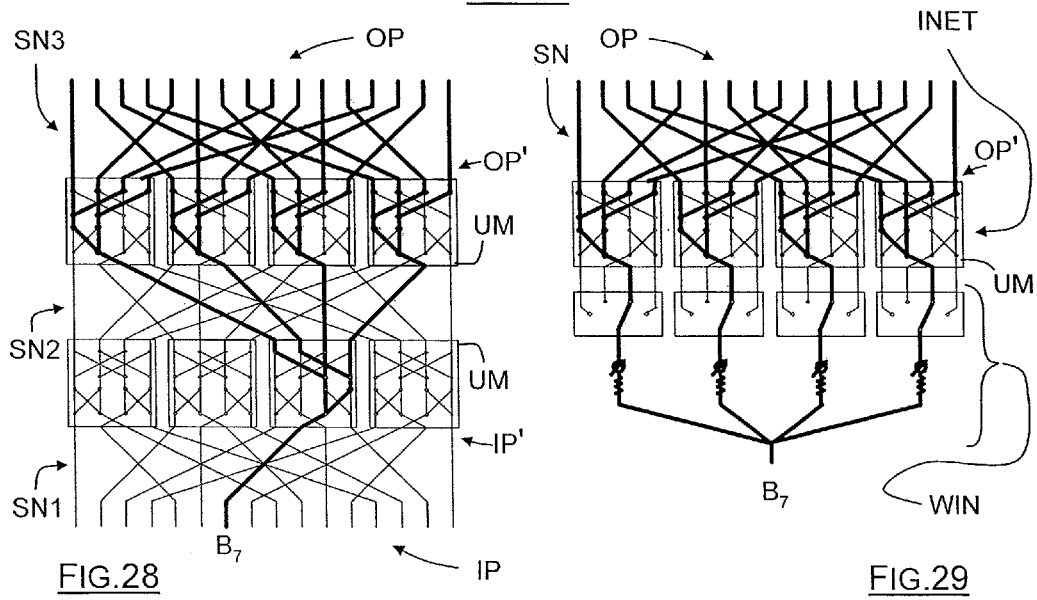
FIGS. 28 and 29, the signal flows in a fully-populated Butler matrix (FIG. 28) and in a reconfigurable BFN according to a sixth embodiment of the invention (FIG. 32)

The decomposition process is pictorially shown in FIG. 28 where a 16 beams times 16 elements Butler/FFT is decomposed accordingly to the Cooley-Tukey algorithm. The decomposition results in an architecture formed of two layers of smaller 4×4 FFT/Butler matrices and three scrambling networks (at the input, between the two layers of FFT/Butler matrices and at the output). More precisely, this BFN comprises:

A first scrambling network, or permutation matrix, SN1 that maps the ordered input ports IP to the inputs IP' of the first layer of FFT/Butler matrices;

A first layer of P FFT/Butler matrices UM of order Q (in the example of FIG. 28, P=Q=4)

A second permutation and phase shift network SN2 that maps the output ports of the first stage of FFT/Butler matrices to the inputs of the second stage of FFT/Butler matrices and performs in each interconnection a phase shift (twiddle factors in the FFT terminology).

A second layer of Q FFT/Butler matrices UM of order P

A third scrambling network SN3 that maps the output ports of the second stage of FFT/Butler matrices OP' to the ordered set of radiating element ports OP.

The intermediate permutation and phase shift matrix can be thought as the product of a permutation matrix times a diagonal matrix with complex unitary exponentials constituting the diagonal elements, also known as twiddle factors. The additional complexity due to the twiddle factors can be avoided in case P and Q are mutually prime numbers. The algorithm performing this simplification is due to I. J. Good and L. H. Thomas and is known as "Prime Factor Algorithm"; for a description refer to the paper of G. M. Blair, A review of the discrete Fourier transform, part 1 and 2 appearing in the Electronics & Communication Engineering Journal, on August and October 1995.

The bold lines on FIG. 28 illustrate the data flow corresponding to a single input signal (e.g. a beam signal) injected into the 16×16 matrix, used as a beamforming network. It can be seen that the beam signal undergoes through a series of phase shifts (including those relevant to one of the first FFT/Butler matrix and, possibly, those relevant to the twiddle factors) and is presented to the second stage of Q FFT/Butler matrices in such a way that only one of port of each of the Q FFT/Butler matrix must be addressed. This condition is verified whatever is the input beam port, what will change is the set of the Q accumulated phase shifts and to which of the P ports of each of the Q FFT/Butler matrices the Q signals will be connected. This is equivalent to say that the first three stages of the architecture perform a partial phase-only beamforming with each beam having just Q weights and each weight interconnected only to one of the $P=N_E/Q$ ports of one matrix of the second stage.

Figure 31A:
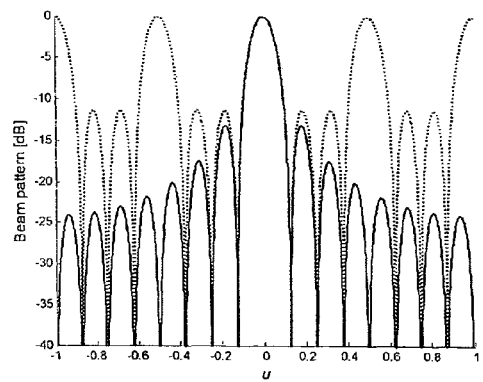
Figure 30B:
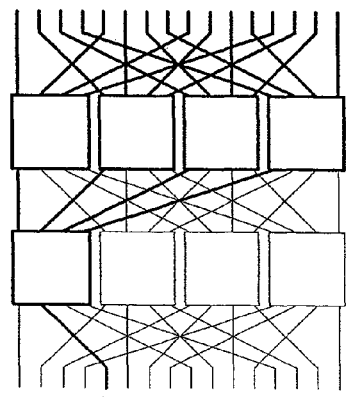
Figure 31B:
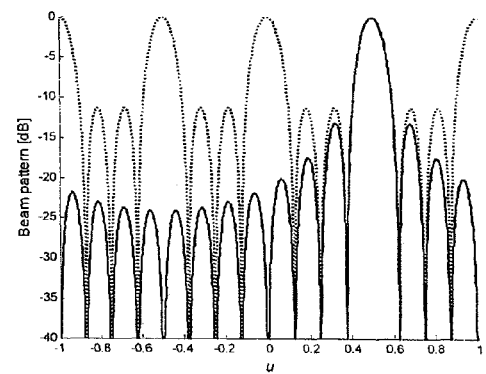
Figure 30C:
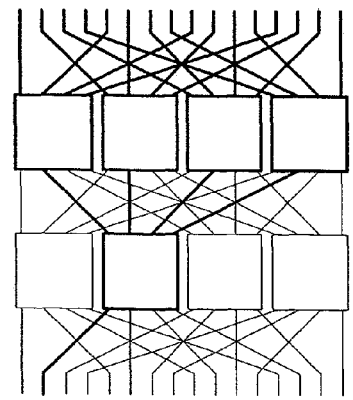
Figure 31C:
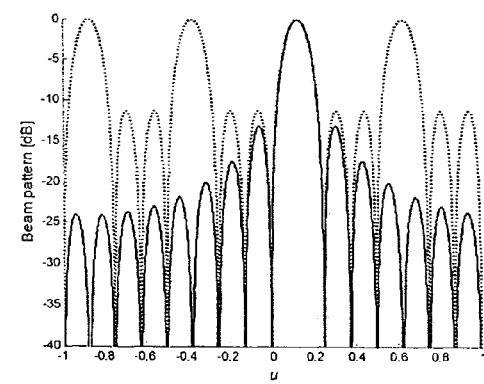

The set of Q FFT/Butler matrices of the second stage can also be interpreted as a set of identical multibeam overlapped sub-arrays. Each sub-array has P input ports and feeds P radiating elements; each port generates a beam that due to the large inter-element spacing (increased of a factor Q) shows a number of main beam aliases or grating lobes (dotted lines on FIGS. 31A-31C). On the other side the spacing between adjacent sub-arrays remains the spacing of the array elements. As shown by the solid lines on FIGS. 31A-31C, the aliases can be removed by appropriately phasing the homologue inputs of the Q FFT/Butler matrices.

In summary, FIGS. 30A-30C and 31A-31C shows that a FFT/Butler matrix does act as a beam-forming network for a direct-radiating array: a beam signal injected into an input port of the matrix (lower end on the figures) generates at the output ports thereof (higher end) feed signals suitable for generating a beam showing a main lobe with a predetermined propagation in space, and comparatively low sidelobes. The propagation direction of the beam depends only on the input port which has been chosen.

A major drawback of a BFN based on the architecture of FIG. 28, and operating as described above, is that it is not reconfigurable, even if variable phase shifters were to be used and it is not of the lowest complexity if a number of beams lower than the number of elements must be generated.

The present inventor has realized that the FFT/Butler matrices of the second stage act as equivalence classes for the first layer of beam weights and that, in order to provide reconfigurability, only one element of each equivalence classes needs to be addressable with flexibility.

Figure 29:
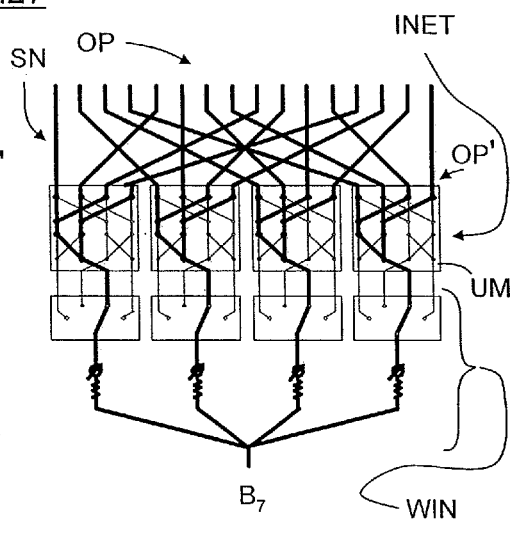
Figure 30A:
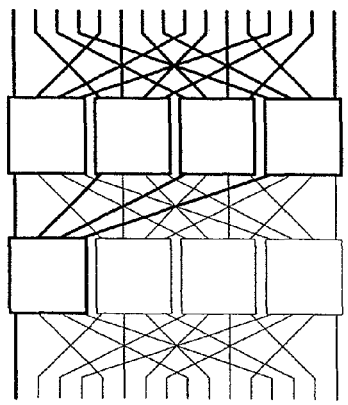
FIGS. 30A-30C and 31A-31C, respectively, signal flows and radiation patterns in a fully-populated Butler matrix (FIG. 28) and in a reconfigurable BFN according to said sixth embodiment of the invention.
Figure 32:
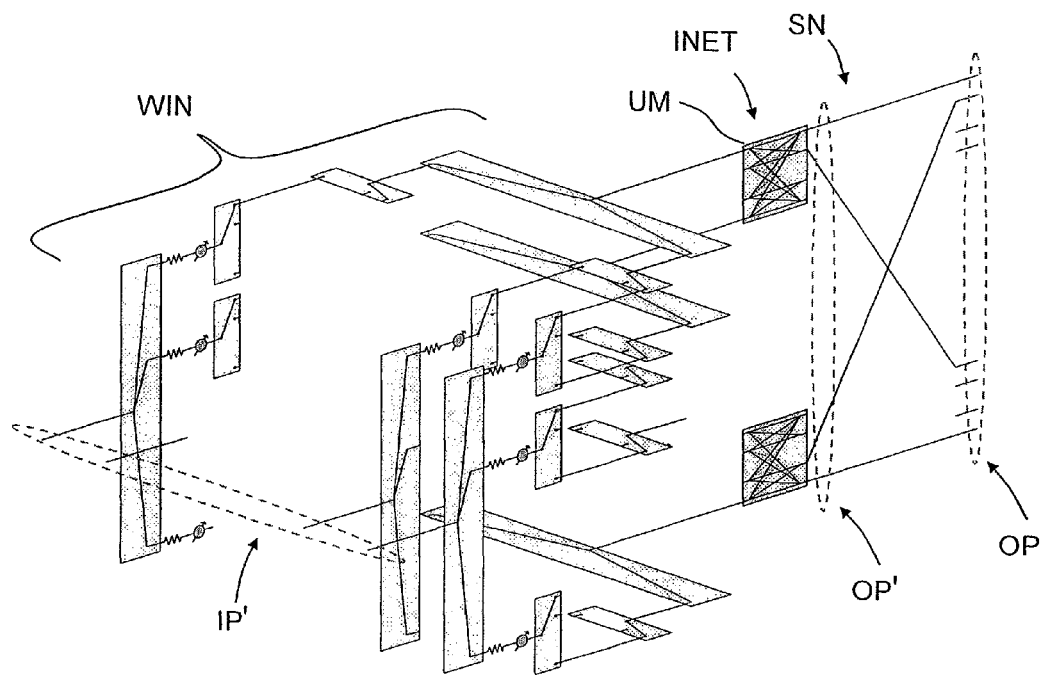
FIG. 32, the topology of a reconfigurable BFN according to said sixth embodiment of the invention.

Therefore, according to an embodiment of the present invention, the first layer of FFT/Butler matrices of the BFN of FIG. 28 can be substituted by a partitioned weighting and interconnecting network WIN of the kind described above with reference to FIG. 4 or 10, resulting in the architecture represented on FIG. 32 and exemplified in FIG. 29 for one beam signal with only the first column of the first layer of switches SW1 of the WIN of FIG. 4 shown. This novel architecture exhibits full reconfigurability jointly to the lower complexity offered by the use of a factorized part of the BFN. It basically comprises two stages:

- a first stage constituted of a reconfigurable BFN accordingly to the weighting and interconnecting network WIN of FIG. 4 or 10, with a number of beam ports equal to the number of beams to be generated $N_B$ and with a number of output ports equal to the number of elements $N_E$ of the array; and
- a second stage INET of $N_E/P$ FFT/Butler matrices of order P and output ports OP' appropriately interconnected to the radiating elements of the planar array via a scrambling network SN with output ports OP.

In the BFN of FIG. 29:

Homologue ports of the P-point FFT/Butler matrices correspond to equivalence classes;

The number of FFT/Butler matrices correspond to Q equivalence class representatives so that $N_{EpB}$=Q; and A number $N_{BpE} \leq P = N_E/Q$ can be determined assessing from the antenna requirements the maximum number of beams overlapping with each of is the P-point FFT/Butler sub-array radiation patterns.

By themselves, the architectures of FIGS. 28 and 29 apply to BFN for one-dimensional arrays. Generalization to the two-dimensional—i.e. planar—case (and more generally to multidimensional cases) is possible thanks to the methods of the Geometry of Numbers which have been used above for defining the equivalence classes of BFN ports for focused/semi-focused array configuration. This permits to have a unique framework for the treatment of the different problems as well as allows applying the same building blocks both to reconfigurable focused solution (e.g. Array Fed Reflectors) and to direct radiating arrays using FFT/Butler BFNs.

First of all, the main properties and characteristics of a Multi-Dimensional FFT algorithm (MD-FFT) have to be outlined. Only the aspects necessary to an understanding of the invention are explained in detail here, the mathematical basis of this type of transform being well known in the signal processing literature. Reference may advantageously be had to the previously mentioned article by Guessoum and Mersereau and to U.S. Pat. No. 5,812,088 to Coromina et alii for an explanation of this algorithm as applied to radiofrequency phased array antennas in hexagonal lattices.

Let a planar array A, with elements on a periodic lattice $\Lambda(D)$, be defined by the elementary cell C(D/DM) of the sub-lattice $\Lambda(DM)$, where D is the non-singular matrix of the inter-element spacings and M is a non-singular integer matrix. The array admits a Multi Dimensional-Discrete Fourier Transform (MD-DFT) whose results are a set of beams pointed in the u,v plane (u=sin θ cos φ; v=sin θ sin φ) with directions defined by the reciprocal lattice $\Lambda((DM)^{-T})$.

Let us now consider the MD-DFT induced on the lattice $\Lambda(I)$ by the lattice $\Lambda(N)$, N being a non-singular integer matrix. It is defined by $$X(m) = \sum_{k \in C(I/N)} x(k) \exp(-j2\pi m^T N^{-1} k)$$

It can be observed that X(m) is periodic on a lattice $\Lambda(M)$ with $M=N^T$. Indeed, each of the exponential terms of the summation, $$\exp(-j2\pi(m+Mn)^T N^{-1} k) = \exp(-j2\pi n^T M^T N^{-1} k)\exp(-j2\pi m^T N^{-1} k)$$

$$N = M^T \Rightarrow M^T N^{-1} = I$$

$$\exp(-j2\pi n^T M^T N^{-1} k) = \exp(-j2\pi n^T k) = 1$$

being $n^T k \in Z$, is periodic on a lattice $\Lambda(M)$:

$$\exp(-j2\pi(m+Mn)^T N^{-1} k) = \exp(-j2\pi m^T N^{-1} k)$$

The inverse (MD-IDFT) is thus defined on a finite lattice of equal dimension $|\det M| = |\det N^T| = |\det N|$ $$x(k) = \sum_{m \in C(I/M)} X(m) \exp(j2\pi m^T N^{-1} k)$$

X(m), with $m \in C(I/M)$, can be interpreted as a radiating element port and x(k), with $k \in C(I/N) = C(I/M^T)$, as a beam port (i.e. respectively the output and the input of a transmit multi-beam BFN). The MD-DFT is then equivalent to a transfer matrix with the following entries $$T_{m,k} = \exp(-j2\pi m^T N^{-1} k) = W_{\det |N|}^{m^T N^{-1} k} = W_{\det |M|}^{m^T M^{-T} k}$$

where $W_N = \exp(-j2\pi/N)$. The equation above can be rearranged as follows:

$$T_{m,k} = \exp(-j2\pi m^T N^{-1} k) =$$
$$= \exp(-j2\pi k^T N^{-T} m) =$$
$$= \exp(-j2\pi k^T (N^{-T} D^{-1}) Dm) =$$
$$= \exp(-j2\pi k^T (M^{-1} D^{-1}) Dn)$$

Assuming identical radiating elements with equal orientation in space and element radiation pattern $f_e(\theta,\phi) = f_e(u)$, where, $$u = \begin{bmatrix} u \\ v \end{bmatrix} = \begin{bmatrix} \sin\vartheta\cos\varphi \\ \sin\vartheta\sin\varphi \end{bmatrix}$$

the scalar array radiation pattern $f(\theta,\phi) = f(u)$ can be written as:

$$f(u) = \sum_{r_m \in A} w_m f_e(\vartheta, \varphi) \exp(jk_0 u \cdot r_m)$$
$$= f_e(u) \sum_{r_m \in A} w_m \exp(jk_0 u \cdot r_m)$$

which is the product of the element radiation pattern $f_e(u)$ times the array factor $AF(\theta,\phi) = AF(u)$, $$AF(u) = \sum_{r_m \in A} w_m \exp(jk_0 u \cdot r_m)$$

$$f(u) = f_e(u) AF(u)$$

Each beam input port k of the BFN realizes a different array factor:

$$AF_k(u) = \sum_{r_m \in A} T_{m,k} \exp(jk_0 u \cdot r_m) =$$

$$= \sum_{m \in C(I/M)} T_{m,k} \exp(jk_0 u^T Dm) =$$

$$= \sum_{m \in C(I/M)} \exp(jk_0 u^T Dm) \exp(-j2\pi k^T (M^{-1} D^{-1}) Dm) =$$

$$= \sum_{m \in C(I/M)} \exp(jk_0 (u^T - \lambda k^T (M^{-1} D^{-1})) Dm) =$$

$$= AF_0(u - u_k)$$

where $r_m = Dm$ with $m \in C(I/M)$ and $A = DC(I/M)$. The steering direction $u_k$ becomes:

$$u_k = \lambda (k^T (M^{-1} D^{-1}))^T = \lambda D^{-T} M^{-T} k \; k \in C(I/M^T)$$

The result leads to an interesting interpretation:
the periodicity matrix D relevant to the array inter-element spacings together with the wavelength $\lambda$ define the lattice $\Lambda(\lambda D^{-T})$ corresponding to the grating lobes positions;
the array configuration, represented by the matrix M, defines a super-lattice $\Lambda(\lambda D^{-T} M^{-T}) \supset \Lambda(\lambda D^{-T} M^{-T} M^T) = \Lambda(\lambda D^{-T})$ and a periodicity matrix $\overline{M}^T$ such that the elements k belonging to the elementary cell $C(I/M^T)$ identify a set of |det M| beam steering directions $u_k \in C(\lambda D^{-T} M^{-T}/\lambda D^{-T})$ $$u_k = \lambda D^{-T} M^{-T} k \; k \in C(I/M^T)$$

This equation can be easily proven:

$$C(\lambda D^{-T} M^{-T} / \lambda D^{-T}) = C(\lambda D^{-T} M^{-T} / \lambda D^{-T} M^{-T} M^T) =$$

$$= \lambda D^{-T} M^{-T} C(I/M^T)$$

The |det M| equi-amplitude excitations relevant to different steering directions are mutually orthogonal:

$$t^*_{k_1} t_{k_2} = |det\, M| \delta(k_1 - k_2)$$

Together these properties guarantee that the transfer matrix defined by a MD-DFT can be used as a transmit multibeam BFN. Unitarity of the DFT (with normalization to $|det\, M|^{1/2}$) guarantees lossless and reciprocity in case of analog implementation. From the DFT-IDFT reciprocity, the MD-IDFT results to be the equivalent receive multibeam BFN.

Similarly to the 1D-DFT, the MD-DFT offers the possibility of a series of efficient implementations known as Multi Dimensional-Fast Fourier Transforms (MD-FFTs).

The 1D Cooley-Tukey algorithm can be extended with the method described by R. Mersereau and T. Speake as described in, "A unified treatment of Cooley-Tukey algorithms for the evaluation of the multidimensional DFT", appearing on the IEEE Transactions on Acoustics, Speech, and Signal Processing, Vol. 29, No 9, pp 1011-1018, October 1981. Their multidimensional extension assumes that the periodicity matrix $N = M^T$ can be decomposed in the product of two integer matrices $P, Q: N = PQ$.

As well, a multidimensional version of the prime factor algorithm was first proposed by A. Guessoum and R. Mersereau in their above-referenced paper, "Fast algorithms for the multidimensional discrete Fourier transform", and later extended by R. Bernardini, G. Cortelazzo and G. Mian in "A new technique for twiddle factor elimination in multidimensional FFT's" IEEE Transactions on Signal Processing, Vol. 42, No. 8, pp. 2176-2178, August 1994, to the more general case for which the periodicity matrix $N = M^T$ could satisfy the followings equalities, $$HNK = PQ$$

$$AP + QB = I$$

with H, K unimodular matrices and A, B suitable integer matrices.

On the basis of the proposed method, a |det M|-points MD-DFT with periodicity matrix $N = M^T$ can be decomposed into |det P|, |det Q|-point DFTs followed by |det Q|, |det P|-point DFTs with or without twiddle factors in between depending which of the two methods is applicable and applied.

The data-flow diagram fully resembles the one already described for the 1D-DFT decomposition in stages. This is equivalent to say that the first three stages of the architecture perform a partial phase only beamforming with each beam having just $N_{EPB} = |det\, Q|$ weights and each weight interconnected only to one of the $|det\, P| = |det\, M|/|det\, Q| = N_E/N_{EpB}$ ports of one matrix of the second stage. The proposed Hybrid FFT—Reconfigurable BFN architecture is thus fully applicable to planar array configurations.

A schematic of the Hybrid FFT—Reconfigurable BFN architecture is reported on FIG. 32. The architecture can be composed of a first stage including the weighting and interconnecting network WIN, of the same kind of the WIN of FIG. 4 or 10, and a second stage INET of low order standard FFT/Butler matrices indicated as UM. It is interesting to note that the BFN of FIG. 32—intended to be used in direct radiating array systems—is indeed identical to that of FIG. 27—intended to be used in focused or semi-focused multimatrix systems, the only secondary difference being that the output ports are differently ordered.

Figure 33:
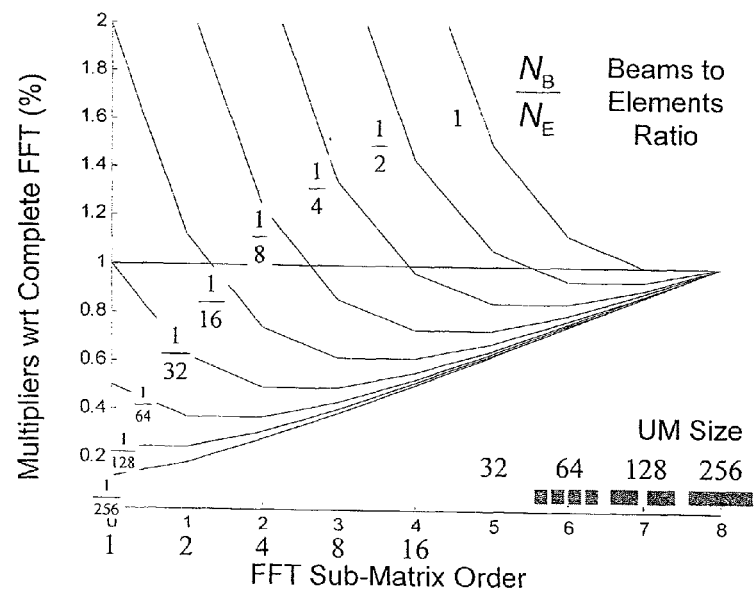
FIG. 33, a plot comparing the complexity of a reconfigurable BFN according to said sixth embodiment of the invention with that of a hybrid FFT/Butler BFN according to the prior art.

The complexity advantage provided by the invention with respect to the case of a "complete" FFT/Butler matrix BFN can be appreciated referring to FIG. 33 where the relative complexity in terms of number of weights (e.g. complex multiplications) of the Hybrid FFT—Reconfigurable BFN of FIG. 32 is compared to that of a generic FFT/Butler BFN. The comparison refers to a 256 elements configuration ($N_E = 256$). Different curves correspond to different values of the beams to elements ratio $N_B/N_E$. The points on the horizontal axis refer to the order of the FFT blocks (equivalent to the order of the overlapped sub-arrays) and indicate the freedom in decomposing 256 in two factors. The vertical axis refers to the number of weights of the Hybrid FFT—Reconfigurable BFN of FIG. 32 normalized with respect to the number of weights of a full 256-point Hybrid FFT. Depending on the beams to elements ratio an optimum size of the small FFT/Butler matrices can be found that minimize the complexity of the BFN hardware.

Figure 34:
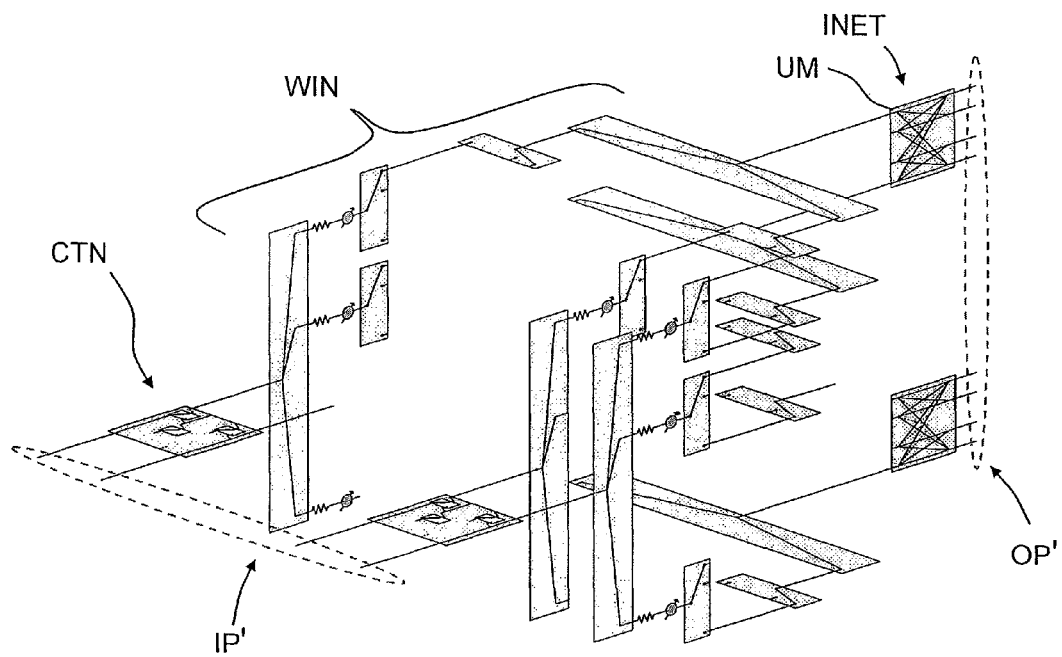
FIG. 34, the topology of a reconfigurable BFN according to a seventh embodiment of the invention.

FIG. 34 illustrates the architecture of a "generic" BFN suitable to be used in array-fed, multimatrix or direct radiating array systems. Such a BFN comprises the following building blocks:

a layer of "copy-tree networks" CTN, to obtain flexibility in the number of element equivalence classes that can be used to form a beam (e.g. for beam-shaping);

a weighting and interconnecting network WIN, comprising signal dividers, weighting elements, switching matrices and signal combiners, as described above with reference to FIG. 10, for performing the core beamforming operations; and a layer INET of unitary matrices UM for multimatrix or direct radiating array applications.

A layer of "add-tree networks" would also be necessary for performing beamforming in reception.

A digital implementation of such a "generic" reconfigurable BFN can benefit of the achievable high grade of microelectronics integration. A single Application Specific Integrated Circuit (ASIC) can integrate all the identified building blocks in a single device and internally route the signal flow accordingly to the used antenna architecture. Furthermore the same device can be used for transmit and receive. A block diagram of such integrated device is reported on FIG. 35 Its various operational configurations are synthetically represented on FIGS. 36A to F.

Figure 35:
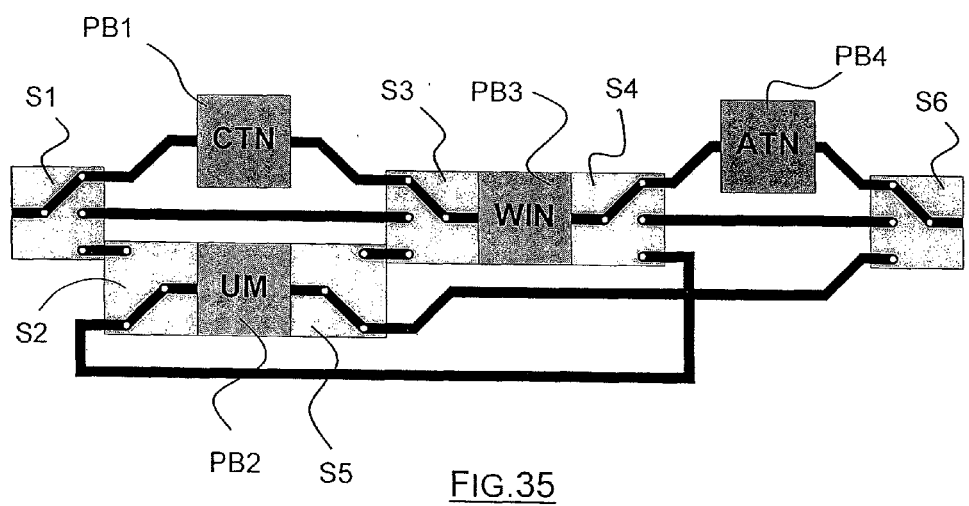
FIG. 35, the topology of an electronic circuit implementing the reconfigurable BFN of FIGS. 10, 22 (and inverse), 27, 32 (and inverse) and 34 (and inverse)

The electronic circuit, or ASIC, represented on FIG. 35 comprises:
a first processing bloc PB1 implementing a "copy-tree network";
a second processing bloc PB2, implementing a set of unitary matrices UM;
a third processing bloc PB3, implementing a weighting and interconnecting network WIN based on the equivalence class partitioning principle (see FIGS. 4, 7 and 10);
a fourth processing bloc PB4, implementing an "add-tree network"; and
a reconfigurable switching network SN for connecting said first to fourth processing blocs.

This circuit can be implemented as an ASIC, but this is by no means essential.

More precisely, said reconfigurable switching network comprises:
a first switch S1 for selectively connecting a first set of input ports IP' (i.e. "beam ports" in transmit and "antenna ports" in receive mode) of the electronic circuit to either the input ports of the "copy-tree network" CTN (PB1), or the input ports of the unitary matrix (PB2), or the input ports of the weighting and interconnecting network WIN (PB3);
a second switch S2 for selectively connecting the input ports of the unitary matrix (PB2) to either the input ports of the electronic circuit (for a receive direct radiating array configuration) or the output ports of the WIN (for a transmit direct radiating array configuration or for a transmit multimatrix BFN configuration);
a third switch S3 for selectively connecting the input ports of the WIN to either the input ports of the electronic circuit, or the output ports of the "copy-tree network" (PB1) or the output ports of the unitary matrix (PB2);
a fourth switch S4 for selectively connecting the output ports of the WIN to either the input ports of the "add-tree network" (PB4), or to the output ports of the electronic circuit, or the input ports of the unitary matrix (PB2);
a fifth switch S5 for selectively connecting the outputs of the unitary matrix (PB2) to the input of the WIN (via switch S3) or to the output of the electronic circuit (via switch S6 described below).
a sixth switch S6 for selectively connecting the output ports of the electronic circuit to either the output ports of the "add-tree network", or the antenna ports of the BFN, or the output ports of the hybrid unitary matrix.

FIG. 36A shows a first configuration of the electronic circuit of FIG. 35 such that only the WIN PB3 is connected to the input ports and the output ports of the circuit. In this configuration, the circuit operates—both in emission and in reception—like the BFN for array-fed application of FIG. 10.

FIG. 36B shows a second configuration of this electronic circuit, wherein the "copy tree network" PB1 is introduced in the signal path in order to obtain flexibility in the number of element equivalence classes that can be used to form a beam in transmission (e.g. for beam-shaping).

FIG. 36C shows a third configuration of this electronic circuit, wherein the "add-tree network" PB4 is introduced in the signal path in order to obtain flexibility in the number of element equivalence classes that can be used to form a beam in reception (e.g. for beam-shaping).

FIG. 36D shows a fourth configuration of this electronic circuit, wherein both the "copy tree network" PB1 at the input and the unitary matrix PB2 at the output are introduced in the signal path in order to drive a multimatrix, with flexibility in the number of element equivalence classes that can be used to form a beam in transmission (e.g. for beam-shaping).

FIG. 36E shows a fifth configuration of this electronic circuit, wherein the unitary matrix PB2 is introduced in the signal path at the output of the WIN PB3 in order to drive a direct-radiating array in transmission.

FIG. 36F shows a sixth configuration of this electronic circuit, wherein the unitary matrix PB2 is introduced in the signal path at the input of the WIN PB3 in order to perform BFN functionalities for a direct-radiating array in receive.

The reconfigurable BFN solution described above offers several advantages, a non exhaustive list of which includes:
Use of an unique architecture for supporting several antenna configurations, such as: Array Fed Reflectors, Multi-Matrix Array Fed Reflectors, Imaging Phased Array, Direct Radiating Array, etc.
Use of a single design covering a large range of mission requirements (e.g. spot-beams/shaped-beams, variable number of beams and elements, variable number of beams per elements and elements per beam, etc).
Scalable design, able to support from few to hundreds/thousand beams and elements.
A wide range of reconfigurability (e.g. steering, pointing, shaping, nulling, channel to beam interconnection, etc.) during the mission lifetime.
A high degree of modularity, provided by the decomposition of the BFN in building blocks. Therefore, larger architectures can be obtained replicating the basic building blocks. Moreover, different functionalities can be obtained differently combining the basic building blocks.
High efficiency in terms of technology and reduced complexity (the reduced complexity advantage should be understood in terms of reduction of the number of devices, mass, area/volume, power consumption, power dissipation, integration and testing time and cost).
The solution is not limited to a particular technology: the architecture can be implemented with analog technology (IF, RF and microwave) or digitally (Digital beamforming).
The solution is applicable to transmit and receive beamforming. In transmit the input are the beams and the output the element ports, conversely, in receive the input are the antenna elements and the output the beams.

A pivotal hypothesis at the basis of the reconfigurable BFN is the use of a limited number of elements per beam, corresponding to an energy localization condition which naturally or by construction (in some cases, thanks to the use of a layer of unitary hybrid matrices) holds in different antenna systems.

The invention claimed is:

1. A beam-forming network comprising:
   a plurality ($N_I$) of input signal ports (IP);
   a plurality ($N_O$) of output signal ports (OP);
   a weighting and interconnecting network (WIN) for associating each input port to at least one output port through respective weighting elements;
   characterized in that
   either input (IP) or output (OP) ports, or both, are partitioned into disjoint equivalence classes (IEC, OEC), at least a majority of said equivalence classes comprising more than one port; and in that
   the weighting and interconnecting network is either constructed to associate each input port to at most one output port for each output equivalence class, or to associate each output port to at most one input port for each input equivalence class, or both.

2. A beam-forming network according to claim 1, wherein at least the output ports (OP) are partitioned into disjoint output equivalence classes (OEC) and wherein substantially all of said output equivalence classes comprises a same number, greater than one, of output ports.

3. A beam-forming network according to claim 1, wherein at least the input ports (IP) are partitioned into disjoint input equivalence classes (IEC), and wherein said input equivalence classes comprise a same number, greater than one, of input ports.

4. A beam-forming network according to claim 1, wherein at least the output ports (OP) are partitioned into disjoint output equivalence classes (OEC), at least a majority of which comprise more than one port, and wherein the weighting and interconnecting network comprises:
   $N_1$ signal dividers of order 1: $N_{OEC}$, each connected to a respective input port, $N_1$ being the number of input ports and $N_{OEC}$ being the number of output equivalence classes of output ports;
   $N_I \cdot N_{OEC}$ amplitude and/or phase weighting elements, each connected to a respective output of said signal dividers;
   $N_I \cdot N_{OEC}$ switches of order 1:($N_O/N_{OEC}$), the single input of each switch being connected to a respective one of said weighting elements, $N_O$ being the number of output ports;
   $N_O$ signal combiners of order $N_1$:1, each connecting an output port to $N_1$ outputs of $N_1$ different switches;
   wherein the signal combiners associated to output ports belonging to a same output equivalence class are connected to different outputs of the same $N_1$ switches, thus ensuring that each input port is associated to at most one output port for each output equivalence class.

5. A beam-forming network according to claim 1, wherein at least the input ports (IP) are partitioned into disjoint input equivalence classes (IEC), at least a majority of which comprise more than one port, and wherein the weighting and interconnecting network comprises:
   $N_1$ signal dividers of order 1: $N_O$, each connected to a respective input port, $N_1$ being the number of input ports;
   $N_O \cdot N_{IEC}$ switches of order ($N_I/N_{IEC}$):1, the inputs of each switch being connected to the outputs of a series of said signal dividers all associated to the same input equivalence class; $N_{IEC}$ being the number of input equivalence classes of input ports $N_O \cdot N_{IEC}$ amplitude and/or phase weighting elements, each connected to the single output of said switches;
   $N_O$ signal combiners of order $N_{IEC}$:1, each connecting an output port to the outputs of $N_{IEC}$ weighting elements;
   wherein the signal dividers associated to input ports belonging to a same input equivalence class are connected to different inputs of the same $N_O$ switches, thus ensuring that each output port is associated to at most one input port for each input equivalence class.

6. A beam-forming network according to claim 1, wherein:
   both input and output ports are partitioned into respective disjoint equivalence classes, at least a majority of said equivalence classes comprising more than one port; and wherein:
   the weighting and interconnecting network (WIN) is configured in order to associate each input port of each inputs equivalence class to at most one output port of each output equivalence class, and each output port of each output equivalence class to at most one input port of each input equivalence class.

7. A beam-forming network according to claim 6, wherein the weighting and interconnecting network (WIN) comprises:
   $N_1$ signal dividers of order 1:$N_{OEC}$, each connected to a respective input port, $N_1$ being the number of input ports, including fictitious input ports which can be introduced in order to ensure that each input equivalence class comprises a same number of input ports, and $N_{OEC}$ being the number of equivalence classes of output ports;
   $N_I \cdot N_{OEC}$ amplitude and/or phase weighting elements, each connected to a respective output of said signal dividers;
   a first layer of $N_I \cdot N_{OEC}$ switches (SW1) of order 1:($N_O/N_{OEC}$), the single input of each switch being connected to a respective one of said weighting elements, $N_E$ being the number of output ports, including fictitious output ports which can be introduced in order to ensure that each output equivalence class comprises a same number of output ports;
   a second layer of $N_O \cdot N_{IEC}$ switches (SW2) of order ($N_I/N_{IEC}$):1, the multiple inputs of each switch of the second layer being connected to respective outputs of switches of the first layer, $N_{IEC}$ being the number of equivalence classes of input ports; and
   $N_O$ signal combiners of order $N_{IEC}$:1, each connecting an output port to $N_{IEC}$ single outputs of respective switches of the second layer;
   wherein the inputs of switches of the second layer whose outputs are connected to homologue ports of combiners associated to output ports belonging to a same equivalence class, are connected to outputs of switches of the first layer whose inputs are connected to homologue ports of signal dividers associated to input ports belonging to a same input equivalence class, thus ensuring that each input port is associated to at most one output port for each equivalence class of output ports, and that each output port is associated to at most one input port for each equivalence class of input ports.

8. A beam-forming network according to claim 7, wherein the switches of the first layer which are associated to input ports of a same input equivalence class, and the corresponding switches of the second layer which are associated to output ports of a same output equivalence class, are jointly implemented in the form of a non-blocking switching matrix (CBM), preferably implemented as a multistage interconnect network (MIN).

9. A beam-forming network according to claim 6, wherein $N_O/N_{OEC} = N_I/N_{IEC}$.

10. A beam-forming network according to claim 1, wherein at least the output ports (OP) are partitioned into disjoint output equivalence classes (OEC), at least a majority of which comprise more than one port, and further comprising a set of up to $N_I/(N_O/N_{OEC})$ multicasting switching networks (CTN), each comprising $N_O/N_{OEC}$ input ports and $N_O/N_{OEC}$ output ports, the output ports of each switching networks being connected to $N_O/N_{OEC}$ different input ports of the weight and interconnect network (WIN); wherein said multicasting switching networks are configurable to connect each input port to zero, one or more output ports, and each output port to one and only one input port.

11. A beam-forming network according to claim 9, further comprising a set of $N_{IEC}$ multicasting switching networks (CTN), each comprising $N_O/N_{OEC}=N_I/N_{IEC}$ input ports and $N_O/N_{OEC}=N_I/N_{IEC}$ output ports, the output ports of each switching networks being connected to the input ports of the weight and interconnect network (WIN) belonging to a respective equivalence class of input ports; wherein said multicasting switching networks are configurable to connect each input port to zero, one or more output ports, and each output port to one and only one input port.

12. A beam-forming network according to claim 1, wherein at least the input ports (IP) are partitioned into disjoint input equivalence classes (IEC), at least a majority of which comprise more than one port, and further comprising a set of $N_O/(N_I/N_{IEC})$ concasting switching networks (ATN), each comprising $N_I/N_{IEC}$ input ports and $N_I/N_{IEC}$ output ports, the input ports of each switching networks being connected to $N_I/N_{IEC}$ different output ports of the weight and interconnect network WIN; wherein said concasting switching networks are configurable to connect each output port to zero, one or more input ports, and each input port to one and only one output port.

13. A beam-forming network according to claim 9, further comprising a set of $N_{OEC}$ concasting switching networks (ATN), each comprising $N_I/N_{IEC}=N_O/N_{OEC}$ input ports and $N_I/N_{IEC}=N_O/N_{OEC}$ output ports, the input ports of each switching networks being connected to the output ports of the weight and interconnect network (WIN) belonging to a respective equivalence class of output ports; wherein said concasting switching networks are configurable to connect each output port to zero, one or more input ports, and each input port to one and only one output port.

14. A beam-forming network according to claim 1, further comprising a layer (INET) of unitary matrices (UM) having input ports connected to the output ports of the weighting and interconnecting network (WIN) and an equal number of output ports connected to the output ports of the beam-forming network, said layer being configured in such a way that the input ports of each unitary matrix (UM) are connected to output ports of the weighting and interconnecting network (WIN) belonging to a respective equivalence class of output ports.

15. A beam-forming network according to claim 14, further comprising a layer of amplifiers (HPA) connected to the output ports of said unitary matrices (UM), and a second layer of multiport hybrid matrices (ONET), connecting output ports of said amplifiers to the output ports of the beam-forming network.

16. A beam-forming network according to claim 1, wherein at least the output ports (OP) are partitioned into disjoint output equivalence classes (OEC), at least a majority of which comprise more than one port, and further comprising:

a layer of unitary matrices (UM) having input ports connected to output ports of the weighting and interconnecting network (WIN), and a scrambling network (SN) for connecting, with a modified ordering, the output ports of the unitary matrices to respective output ports of the beam-forming network.

17. A beam-forming network according to claim 16, wherein the inputs of each of said unitary matrices are connected to output ports of the weighting and interconnecting network (WIN) belonging to a respective equivalence class of output ports and said scrambling network (SN) is configured in order to connect the output ports of each unitary matrix to output ports of the beam-forming network belonging to a same equivalence class of output ports.

18. A beam-forming network according to any of the claim 1, wherein at least the input ports (IP) are partitioned into disjoint input equivalence classes (IEC), at least a majority of which comprise more than one port, and further comprising:

a scrambling network (SN) for connecting, with a modified ordering, the input ports of the unitary matrices to respective input ports of the beam-forming network, and a layer of unitary matrices (UM) having output ports connected to input ports of the weighting and interconnecting network (WIN).

19. A beam-forming network according to claim 18, wherein the outputs of each of said unitary matrices are connected to input ports of the weighting and interconnecting network (WIN) belonging to a respective equivalence class of input ports and said scrambling network (SN) is configured in order to connect the input ports of each unitary matrix to input ports of the beam-forming network belonging to a same equivalence class of input ports.

20. A multibeam array antenna comprising:
a beam-forming network according to claim 1; and
an array (AR) constituted by a plurality of antenna elements (AE) organized in a lattice; wherein
said antenna elements are connected either to output or to input ports of the beam-forming network in such a way that each equivalence class of output or input ports corresponds to a sub-lattice of antenna elements of said array.

21. A multibeam array antenna according to claim 20 wherein beams are organized in a lattice and either the input or output ports of said beam-forming network, opposite to the ports connected to said antenna elements, are organised in such a way that each equivalence class of said ports corresponds to a sub-lattice of beams of said beams lattice and beams of each sub-lattice use disjoint groups of antenna elements to form a beam.

22. A multibeam array antenna comprising:
a beam-forming network according to any claim 14; and
an array (AR) constituted by a plurality of antenna elements (AE) organized in a lattice; wherein
said antenna elements are connected to output ports of said layer (ONET) of multiport hybrid matrices (UM) in such a way that each equivalence class of said output ports corresponds to a sub-lattice of antenna elements of said array.

23. A multibeam array antenna according to claim 20, further comprising a focusing element, the array of antenna element constituting a fed array for said focusing element; whereby the multibeam array antenna is of the focused or semi-focused type.

24. A multibeam array antenna of the focused or semi-focused type according to claim 23, wherein the antenna elements belonging to different equivalence classes are adjacent to each other and form an elementary cell (FVR) of the lattice of the array (AR) of antenna elements.

25. A multibeam array antenna of the direct-radiating type comprising:
- a beam-forming network according to claim 16; and
- an array (AR) of the direct-radiating type constituted by a plurality of antenna elements (AE) organized in a lattice and connected to either the input or the output ports of said beam-forming network in such a way that each equivalence class of said ports corresponds to a sub-lattice of antenna elements of said array.

26. An electronic circuit comprising:
- a first processing bloc (PB1) having a first number of input ports and the same number of output ports, and comprising a set of multicasting switching networks configurable to connect each input port to zero, one or more output ports, and each output port to one and only one input port;
- a second processing bloc (PB2), having said first number of input ports and the same number of output ports, and comprising a set of unitary matrices;
- a third processing bloc (PB3), comprising a beam-forming network according to claim 1 having said first number of input ports and a second number of output ports;
- a fourth processing bloc (PB4), having said second number of input ports and the same number of output ports, and comprising a concasting switching network configurable to connect each output port to zero, one or more input ports, and each input port to one and only one output port; and
- a reconfigurable switching network (SN) for connecting said first to fourth processing blocs.

27. An electronic circuit according to claim 26, wherein said reconfigurable switching network comprises:
- a first switch (S1) for selectively connecting a first set of input ports of the electronic circuit to either the input ports of the first processing bloc, or the input ports of the second processing bloc, or the input ports of the third processing bloc;
- a second switch (S2) for selectively connecting the input ports of the second processing bloc to either the input ports of the electronic circuit or the output ports of the third processing bloc;
- a third switch (S3) for selectively connecting the input ports of the third processing bloc to either the input ports of the electronic circuit, or the output ports of the first processing bloc or the output ports of the second processing bloc;
- a fourth switch (S4) for selectively connecting the output ports of the third processing bloc to either the input ports of the fourth processing bloc, or to the output ports of the electronic circuit or the input ports of the second processing bloc;
- a fifth switch (S5) for selectively connecting the outputs of the second processing bloc to the input of the third processing bloc (via switch S3) or to the output of the electronic circuit (via switch S6 described below).
- a sixth switch (S6) for selectively connecting the output ports of the electronic circuit to either the output ports of the fourth processing bloc, or the output ports of the third processing bloc, or the output ports of the second processing bloc.

\* \* \* \* \*

UNITED STATES PATENT AND TRADEMARK OFFICE
CERTIFICATE OF CORRECTION

PATENT NO. : 8,451,172 B2
APPLICATION NO. : 12/879420
DATED : May 28, 2013
INVENTOR(S) : Angeletti It is certified that error appears in the above-identified patent and that said Letters Patent is hereby corrected as shown below:

In the Claims:

Column 34,
Line 16, "according to any of the claim" should read --according to the claim--.

Signed and Sealed this
Twentieth Day of August, 2013

Teresa Stanek Rea
*Acting Director of the United States Patent and Trademark Office*